(12) United States Patent
Nakamura et al.

(10) Patent No.: US 12,525,036 B2
(45) Date of Patent: Jan. 13, 2026

(54) VEHICLE SERVICE PROVIDING SYSTEM

(71) Applicant: SUBARU CORPORATION, Tokyo (JP)

(72) Inventors: Ryota Nakamura, Tokyo (JP); Konan Kagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 14 days.

(21) Appl. No.: 18/583,097

(22) Filed: Feb. 21, 2024

(65) Prior Publication Data

US 2024/0193966 A1 Jun. 13, 2024

Related U.S. Application Data

(63) Continuation of application No. PCT/JP2022/033978, filed on Sep. 11, 2022.

(51) Int. Cl.

| | |
|---|---|
| *G06V 20/59* | (2022.01) |
| *A61B 5/00* | (2006.01) |
| *G06T 3/18* | (2024.01) |
| *G06V 10/74* | (2022.01) |
| *G06V 40/16* | (2022.01) |
| *H04N 7/18* | (2006.01) |

(52) U.S. Cl.
CPC .......... *G06V 20/59* (2022.01); *A61B 5/0077* (2013.01); *A61B 5/6893* (2013.01); *G06T 3/18* (2024.01); *G06V 10/761* (2022.01); *G06V 40/162* (2022.01); *G06V 40/165* (2022.01); *G06V 40/171* (2022.01); *H04N 7/183* (2013.01); *A61B 2503/22* (2013.01)

(58) Field of Classification Search
CPC ...... H04N 7/183; G06V 10/761; G06V 20/59; G06V 40/161; G06V 40/162; G06V 40/165; G06V 40/171; G06T 1/00; G06T 3/18; A61B 2503/22; A61B 5/0077; A61B 5/18; A61B 5/6893
USPC ......................................................... 348/148
See application file for complete search history.

(56) References Cited

U.S. PATENT DOCUMENTS

2022/0289250 A1 9/2022 Oba

FOREIGN PATENT DOCUMENTS

| JP | 2014067131 A | * | 4/2014 |
|---|---|---|---|
| JP | 2021-043571 A | | 3/2021 |

* cited by examiner

*Primary Examiner* — Kathleen M Walsh
(74) *Attorney, Agent, or Firm* — Rimon P.C.

(57) ABSTRACT

A vehicle service providing system includes a vehicle and a server apparatus. The server apparatus provides a service based on information received from the vehicle. The vehicle includes an in-vehicle camera for capturing an image of an and a vehicle controller. The server apparatus includes an output unit for outputting an image and a server controller. The vehicle controller determines and selects a sample face image whose degree of similarity in luminance value is highest from acquired sample face images. The vehicle controller carries out morphing of making the selected sample face image closer to the face of the occupant, to generate and transmit a morphed face image. The server controller causes the output unit to output the morphed face image generated by the morphing, instead of an image of the face of the occupant.

9 Claims, 14 Drawing Sheets

[FIG. 9]
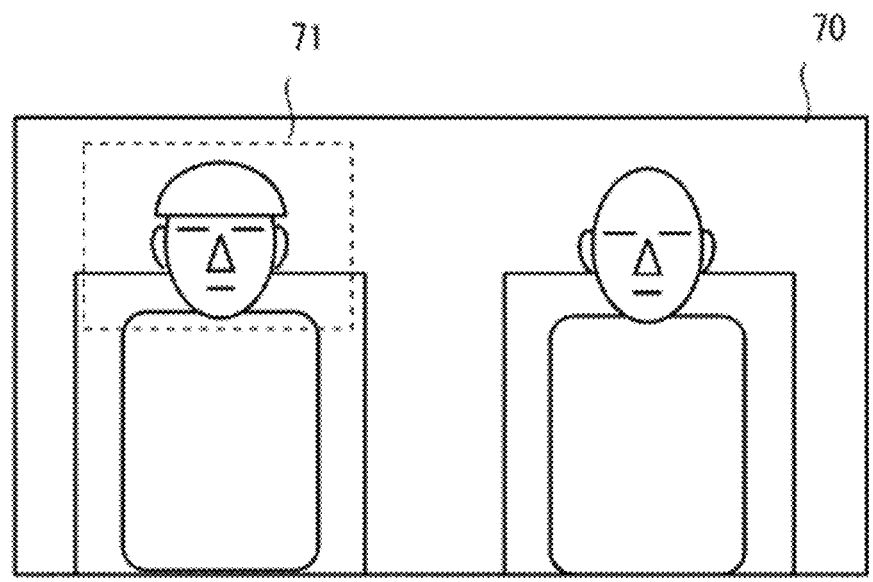
[FIG. 10]
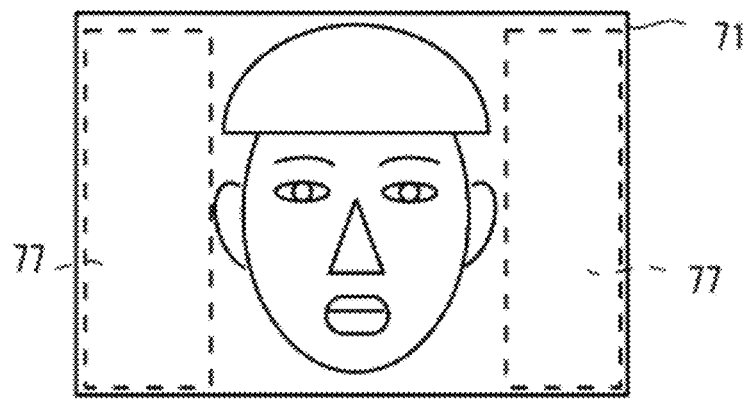
[FIG. 11]
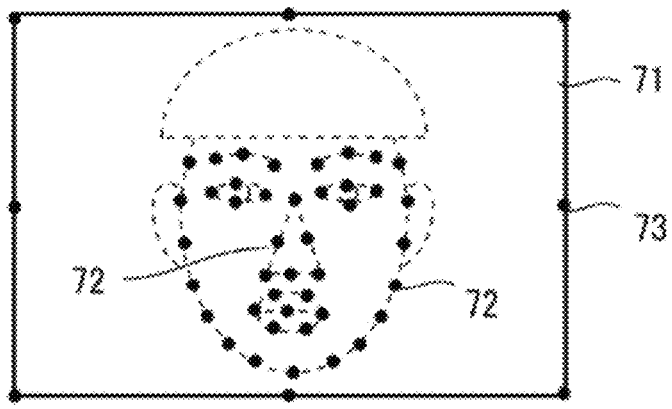

[ FIG. 12 ]
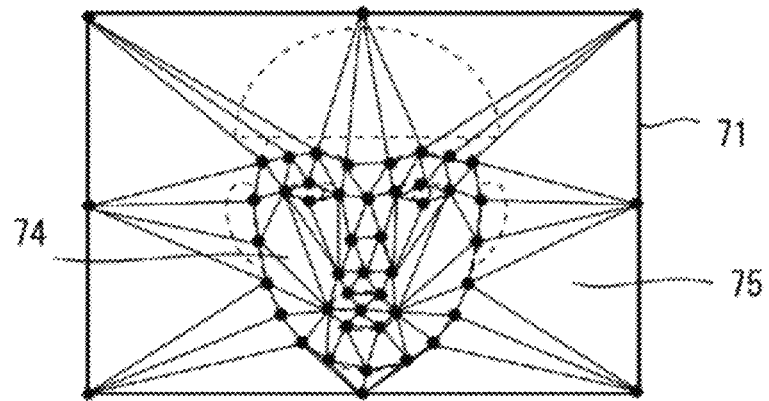
[ FIG. 13 ]
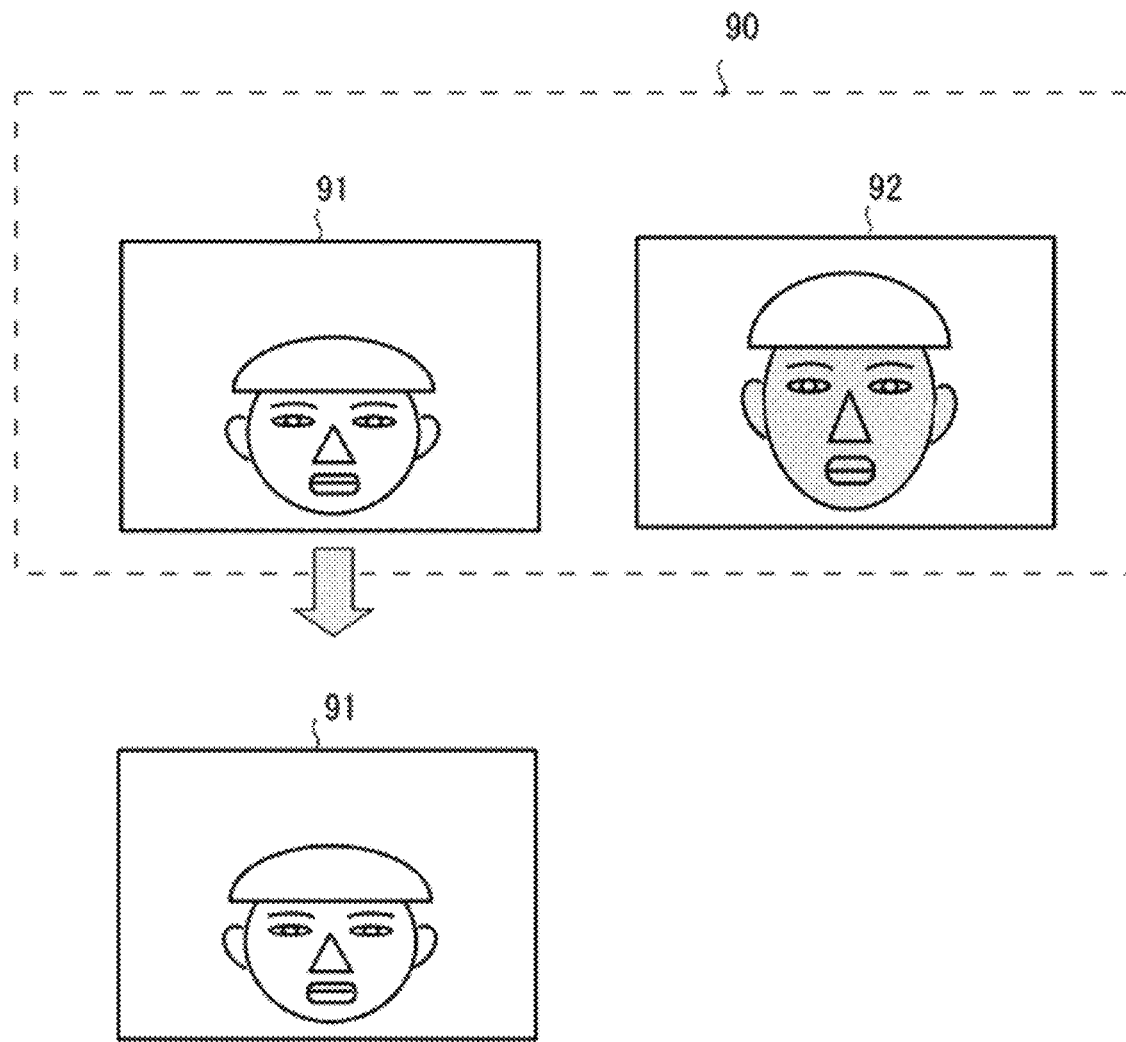

[ FIG. 14 ]
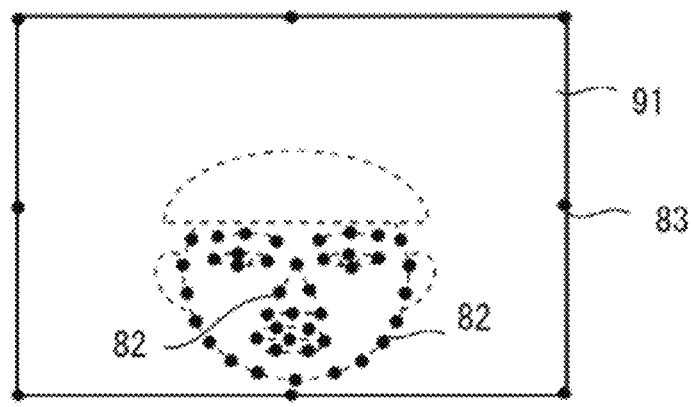
[ FIG. 15 ]
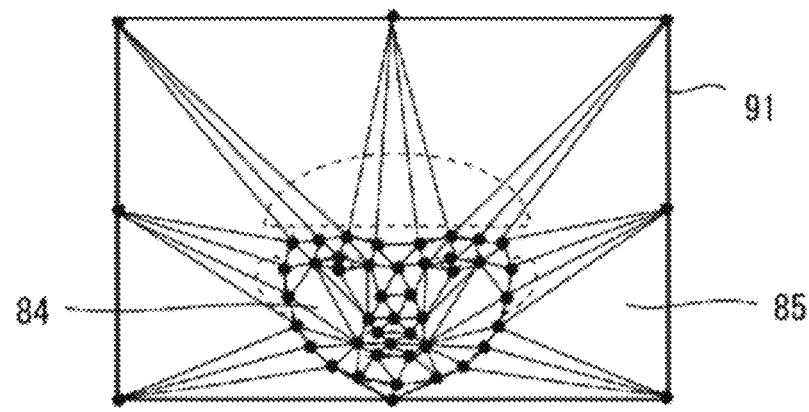
[ FIG. 16 ]
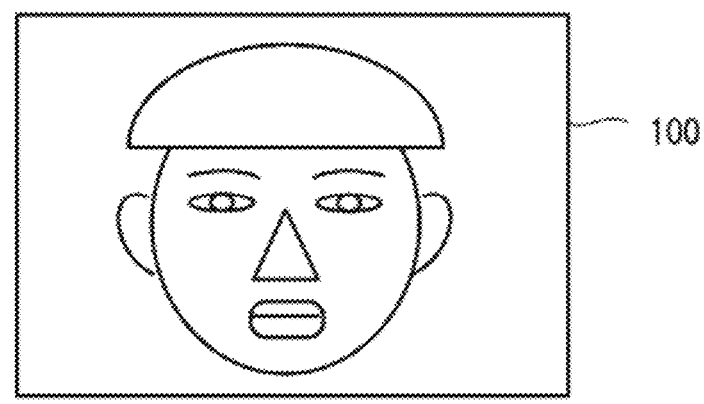

[ FIG. 18 ]
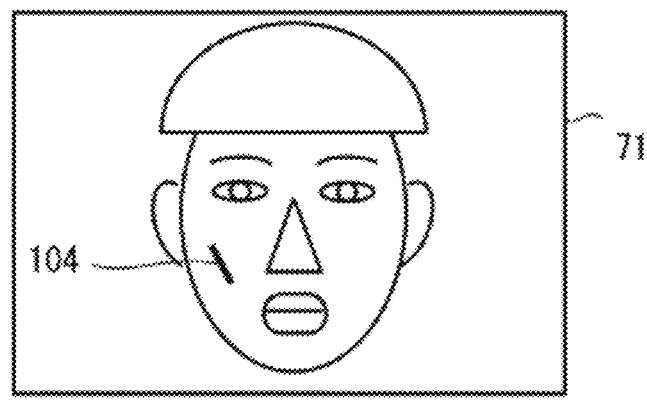
[ FIG. 19 ]
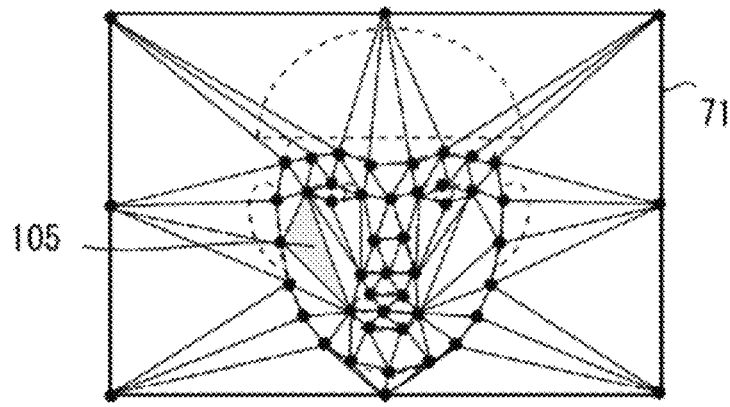
[ FIG. 20 ]
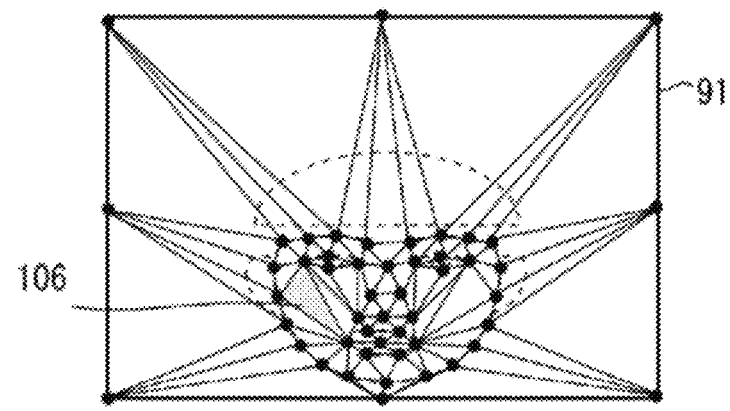

[FIG. 21]
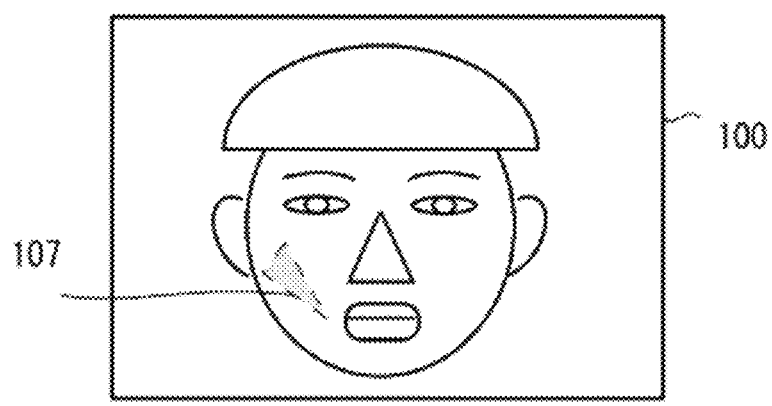

VEHICLE SERVICE PROVIDING SYSTEM

CROSS-REFERENCE TO RELATED APPLICATIONS

This application is continuation of International Application No. PCT/JP2022/033978, filed on Sep. 11, 2022, the entire contents of which are hereby incorporated by reference.

BACKGROUND

The invention relates to a vehicle service providing system.

A vehicle such as an automobile can have a malfunction of the vehicle itself while traveling, or an occupant of the vehicle can feel ill while traveling.

Moreover, sometimes, it is desirable that various content services be available to a vehicle or an occupant while traveling.

These vehicle services may include, for example, an emergency response service, an occupant monitoring service for the emergency response service, and a content providing service. The emergency response service includes dealing with a malfunction of a vehicle or illness of an occupant.

When such a vehicle service providing system provides a vehicle service, basically, a vehicle transmits information to a server apparatus, and the server apparatus provides the service based on the information received.

The following Patent Literatures are referred to this application.
Patent Literature 1: Japanese Unexamined Patent Application Publication No. 2021-043571
Patent Literature 2: Japanese Unexamined Patent Application Publication No. 2014-067131

SUMMARY

A vehicle service providing system according to an embodiment of the invention includes a vehicle and a server apparatus. The vehicle transmits information to the server apparatus. The server apparatus provides a service based on the information received. The vehicle includes an in-vehicle camera and a vehicle controller. The in-vehicle camera is configured to capture an image of an occupant of the vehicle. The server apparatus includes an output unit and a server controller. The output unit outputs an image. The vehicle controller is configured to: execute an occupant image acquisition process of acquiring a captured image including a face of the occupant, from the in-vehicle camera, a luminance value generation process of generating a luminance value of the face of the occupant in the acquired captured image, a sample image acquisition process of acquiring sample face images regarding other persons different from the occupant to be segmented from the captured image, a determination process of determining a degree of similarity between luminance values of the acquired sample face images and the luminance value of the face of the occupant generated by the luminance value generation process, a selection process of selecting a sample face image whose degree of similarity in the luminance value is highest in the determination process, and a morphing process of carrying out morphing of making the selected sample face image closer to the face of the occupant in the acquired captured image, to generate a morphed face image; and transmit the morphed face image generated by the processes to the server apparatus, instead of the captured image including the face of the occupant. The server controller is configured to execute, with use of information received from the vehicle controller of the vehicle, a process not executed by the vehicle controller, among the luminance value generation process, the sample image acquisition process, the determination process, the selection process, and the morphing process, and cause the output unit to output the morphed face image generated by the morphing process, instead of an image of the face of the occupant of the vehicle.

BRIEF DESCRIPTION OF THE DRAWINGS

FIG. 9 is an explanatory diagram of an example of a captured image by an in-vehicle camera in FIG. 4.

FIG. 10 is an explanatory diagram of an example of a face image as a captured region of a face of a driver segmented from the captured image in FIG. 9.

FIG. 11 is an explanatory diagram of an example of point group information to be generated regarding the face image of the driver in FIG. 10.

FIG. 12 is an explanatory diagram of an example of patch information to be generated regarding the face image of the driver in FIG. 10.

FIG. 13 is an explanatory diagram of an example of a combination of multiple sample face images.

FIG. 14 is an explanatory diagram of an example of point group information to be generated regarding a selected sample face image in FIG. 13.

FIG. 15 is an explanatory diagram of an example of patch information to be generated regarding the selected sample face image in FIG. 13.

FIG. 16 is an explanatory diagram of an example of a morphed face image to be transmitted from the automobile to the outside as a face image of an occupant.

FIG. 18 is an explanatory diagram of an example of a face image as a captured region of the face of the driver in the present embodiment.

FIG. 19 is an explanatory diagram of an example of point group information and patch information to be generated regarding the face image of the driver in FIG. 10.

FIG. 20 is an explanatory diagram of an example of point group information and patch information to be generated regarding the sample face image selected from among the multiple sample face images.

FIG. 21 is an explanatory diagram of an example of a morphed face image to be transmitted from the automobile to the outside as a face image of the occupant.

DETAILED DESCRIPTION

Figure 1:
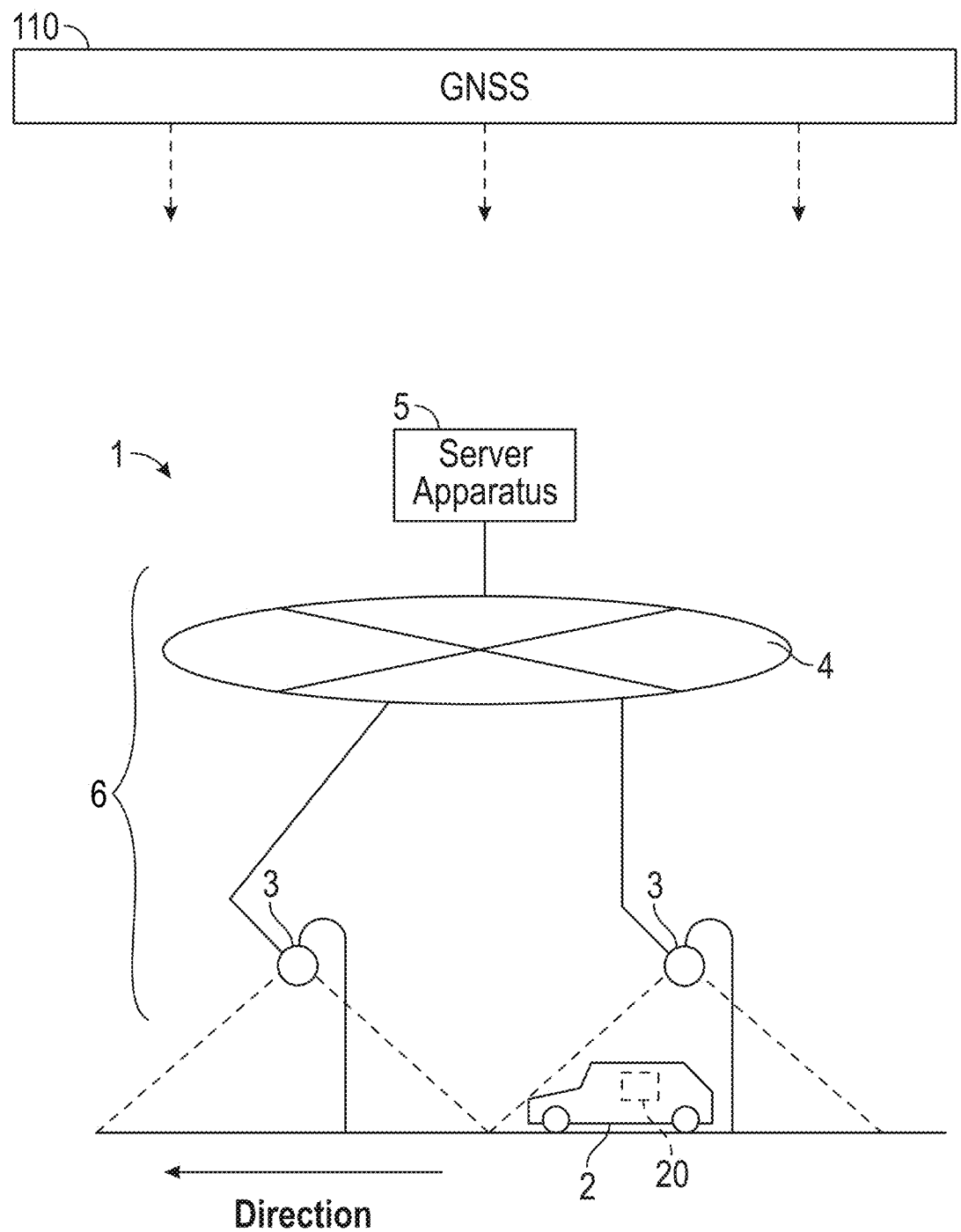
FIG. 1 is a system configuration diagram of a vehicle service providing system according to a first embodiment of the invention.

Incidentally, when such a vehicle service providing system provides, in particular, an emergency response service and an occupant monitoring service described above, the vehicle service providing system is expected to transmit, for example, a captured image by an in-vehicle camera from a vehicle to a server apparatus. The captured image indicates a state of an occupant. The captured image by the in-vehicle camera is outputted to and displayed on the server apparatus, making it possible for an operator to accurately grasp, for example, a current state and expression of the occupant, based on the captured image of the occupant. This results in provision of an optimal service for the current state of the occupant, etc.

On the other hand, depending on the kind of information, information transmission from the vehicle to the server apparatus as described above may be restricted based on, for example, laws and regulations. For example, in Europe, independent strict restrictions have been imposed on transmission and reception of personally identifiable information.

Moreover, a company that intends to deal with protection of such personal information would like to voluntarily put favorable limitations on the information to be transmitted from a vehicle to a server apparatus.

The captured image of the occupant of the vehicle described above includes an image component of the face of the occupant. The face of the occupant is personal information and deserves appropriate protection.

Patent Literatures 1 and 2 disclose abstraction or substitution of an image component of the face of an occupant included in a captured image.

However, when the image component of the face of the occupant is abstracted or substituted as in Patent Literatures 1 and 2 and the image is outputted to a server apparatus, an operator can have difficulty in accurately grasping, for example, the current state or the expression of the occupant based on the image.

In particular, for example, a state of an injury to the face of the occupant is expected to be checkable in an emergency response service and an occupant monitoring service. Such a situation is not checkable based on a abstracted or substituted image.

As described, what is desired for a vehicle service providing system is to protect personal information while avoiding impairment of convenience of the vehicle service providing system.

In the vehicle service providing system according to the invention, the vehicle controller of the vehicle and the server controller of the server apparatus execute the occupant image acquisition process, the luminance value generation process, the sample image acquisition process, the determination process, the selection process, and the morphing process. The server controller causes the output unit to output the morphed face image generated by the morphing process, instead of the image of the face of the occupant of the vehicle. This allows the output unit to output the face image that reflects the state of the occupant, e.g., the expression of the occupant. As a result, it is possible for the operator to grasp, for example, the current actual state or the expression of the occupant based on the face image outputted. It tends not to be difficult for the operator to accurately grasp, for example, the current actual state or the expression of the occupant, unlike a case where an image component of the face of the occupant is abstracted, substituted, or masked.

In particular, in the invention, the sample face image having a high degree of similarity to the luminance value of the face of the occupant is selected from among the multiple sample face images, instead of executing morphing of making a single fixed face image different from the occupant closer to the face of the occupant. This allows the image of the face of the occupant of the vehicle to be outputted from the output unit of the server apparatus to be a face image close to the luminance value of the face of the occupant, in accordance with the occupant. As a result, it is presumably possible for the operator to grasp an appearance of the occupant and more accurately determine the state of the occupant, based on the output of the face image corresponding to the occupant, unlike a case where a face image of a single fixed other person is outputted at all times.

Moreover, the vehicle controller of the vehicle executes the occupant image acquisition process, the segmentation process, the point group generation process, the patch generation process, the sample image acquisition process, and the morphing process, and transmits the morphed face image generated by the processes to the server apparatus, instead of the captured image including the face of the occupant. Hence, in the invention, it is possible to refrain from transmitting the face image of the occupant itself to the outside. The face image of the occupant deserves protection as personal information regarding the occupant.

As described, in the invention, selecting and morphing the sample face image similar to the luminance value of the actual face of the occupant makes it possible to protect personal information while avoiding impairment of convenience of the vehicle service providing system.

In the following, some embodiments of the invention are described with reference to the accompanying drawings.

First Embodiment

FIG. 1 is a configuration diagram of a vehicle service providing system 1 according to a first embodiment of the invention.

The vehicle service providing system 1 in FIG. 1 includes an automobile 2 and a server apparatus 5. The server apparatus 5 is configured to provide the automobile 2 with a vehicle service. The automobile 2 and the server apparatus 5 transmit and receive information to and from each other through a communication network system 6.

Here, the automobile 2 is an example of a vehicle. Basically, the automobile 2 may be configured to accommodate multiple occupants. In the automobile 2 configured to accommodate multiple occupants, a driver and an assistant may be seated side by side in a vehicle width direction. However, the vehicle to which the invention is applicable is not limited to the automobile 2 having such features.

The communication network system 6 in FIG. 1 includes multiple base stations 3 and a communication network 4. The base stations 3 are arranged along a travel route of the automobile 2. To the communication network 4, the base stations 3 and the server apparatus 5 are coupled. The base stations 3 may be, for example, base stations of a carrier communication network for mobile terminals, etc. Alternatively, the base stations 3 may be base stations for an ITS service or an ADAS service for the automobile 2. Some fifth-generation base stations of carrier communication networks have a high-performance information processing function. In this case, the server apparatus 5 may be distributively provided in the base stations 3.

The automobile 2 can sometimes have a malfunction of the automobile 2 itself while traveling, or an occupant of the automobile 2 can feel ill while traveling.

Moreover, an occupant sometimes uses various kinds of content services while traveling in the automobile 2. Examples of the content services include a music distribution service and a video distribution service.

The vehicle service providing system 1 is configured to provide the automobile 2 with these vehicle services, by using the server apparatus 5 that transmits and receives information to and from the automobile 2. The vehicle service providing system 1 may provide, for example, an emergency response service and a monitoring service for the emergency response service. The emergency response service includes, for example, dealing with a malfunction of the automobile 2 or the illness of the occupant of the automobile 2. Moreover, the vehicle service providing system 1 may allow the server apparatus 5 to provide content information.

Figure 2:
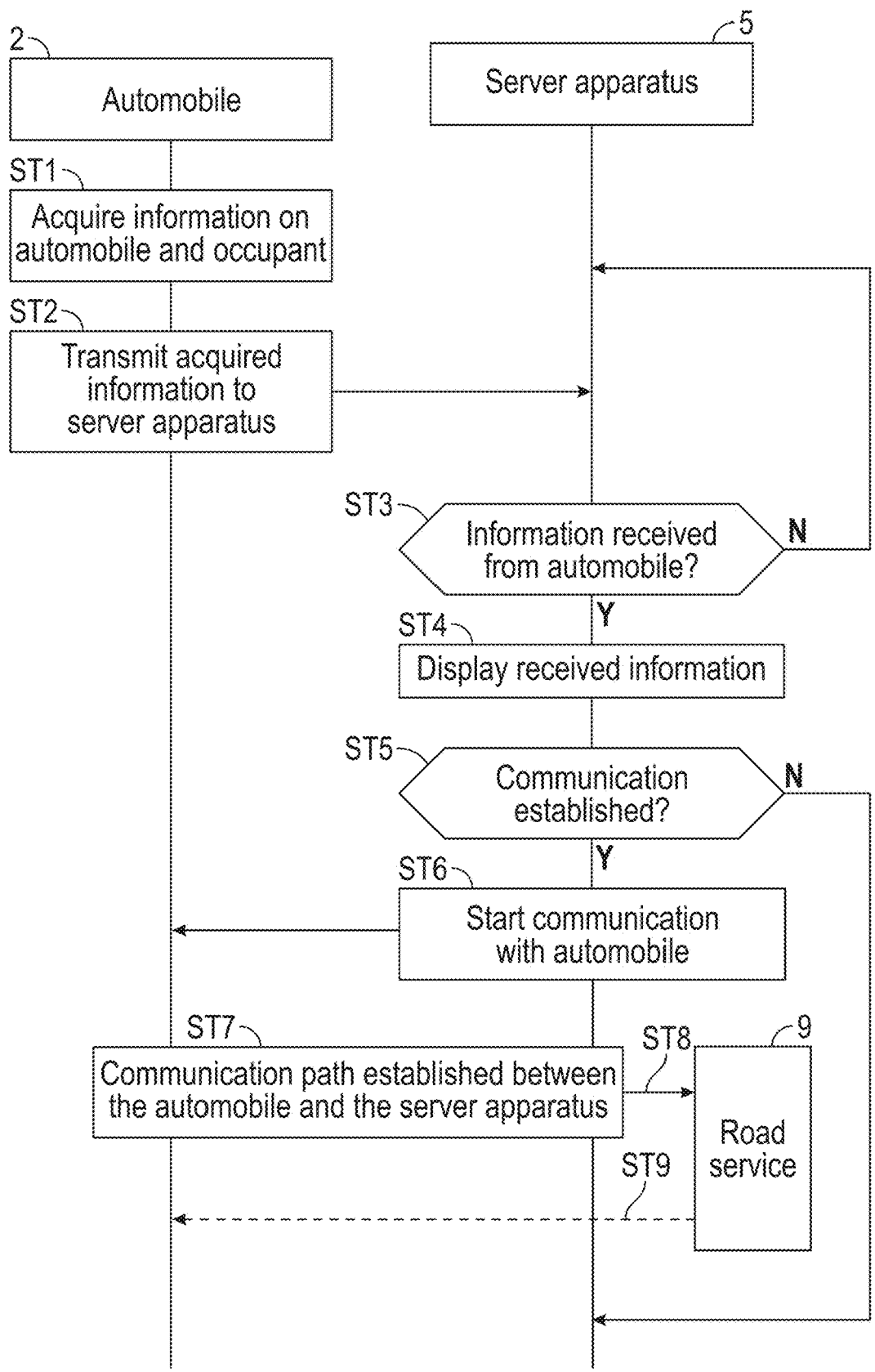
FIG. 2 is an explanatory diagram of a basic communication procedure between an automobile and a server apparatus in FIG. 1, in an example where the vehicle service providing system in FIG. 1 provides an emergency response service.

FIG. 2 is an explanatory diagram of a basic communication procedure between the automobile 2 and the server apparatus 5 in FIG. 1, in an example where the vehicle service providing system 1 in FIG. 1 provides the emergency response service. FIG. 2 illustrates the automobile 2 and the server apparatus 5. Time flows from top to bottom.

In FIG. 2, in step ST1, the automobile 2 acquires information regarding the automobile 2 and the occupant. In step ST2, the automobile 2 transmits the acquired information to the server apparatus 5. The information to be transmitted from the automobile 2 to the server apparatus 5 may include information indicating, for example, a state of the automobile 2, and information indicating, for example, a state of the occupant.

In step ST3, the server apparatus 5 waits for information reception from the automobile 2. Upon receiving the information from the automobile 2, in step ST4, the server apparatus 5 outputs the received information by, for example, displaying the information. This makes it possible for an operator to check the information regarding the automobile 2 and the occupant. When the operator determines that it is necessary to confirm the information with the occupant, the operator makes an operation on the server apparatus 5. After outputting the received information, in step ST5, the server apparatus 5 determines whether or not to establish communication. When the server apparatus 5 accepts the operation by the operator, the server apparatus 5 determines that it is necessary to establish communication. In step ST6, the server apparatus 5 starts communication with the automobile 2. Thus, in step ST7, a communication path is established between the automobile 2 and the server apparatus 5. The communication path allows the operator and the occupant to communicate with each other by speech or video.

When the operator determines that an emergency response is necessary, based on a call with the occupant, the operator makes an operation on the server apparatus 5. In step ST8, the server apparatus 5 gives an urgent notification to a road service 9. Based on the notification, in step ST9, the road service 9 goes into action for the automobile 2. The road service 9 provides a vehicle service for the emergency response.

Thus, it is possible for the automobile 2 or the occupant to have the emergency response service provided by the vehicle service providing system 1.

As described, in the vehicle service providing system 1, to provide the vehicle service, basically, the automobile 2 transmits the information to the server apparatus 5, and the server apparatus 5 provides the service based on the received information.

Incidentally, when such a vehicle service providing system 1 provides, in particular, the emergency response service and the occupant monitoring service described above, it is desired to transmit, for example, a captured image by an in-vehicle camera 55 indicating the state of the occupant from the automobile 2 to the server apparatus 5. The captured image by the in-vehicle camera 55 is outputted to and displayed on the server apparatus 5, making it possible for the operator to accurately grasp, for example, the current state and expression of the occupant based on the captured image of the occupant. As a result, it is possible for the operator to provide, for example, an optimal service in accordance with, for example, the current state of the occupant.

On the other hand, depending on the kind of information, information transmission from the automobile 2 to the server apparatus 5 as described above is sometimes restricted based on, for example, laws and regulations. For example, in Europe, independent strict restrictions have been imposed on transmission and reception of personally identifiable information.

Moreover, a company that intends to deal with protection of such personal information would like to voluntarily put limitations on the information to be transmitted from the automobile 2 to the server apparatus 5.

The captured image of the occupant of the automobile 2 described above includes an image component of the face of the occupant. A photograph of the face of the occupant as well as, for example, the name of the occupant is personal information and deserves appropriate protection as necessary in accordance with requirement by laws and regulations.

As described, what is desired for the vehicle service providing system 1 is to protect personal information while avoiding impairment of convenience of the vehicle service providing system 1.

Figure 3:
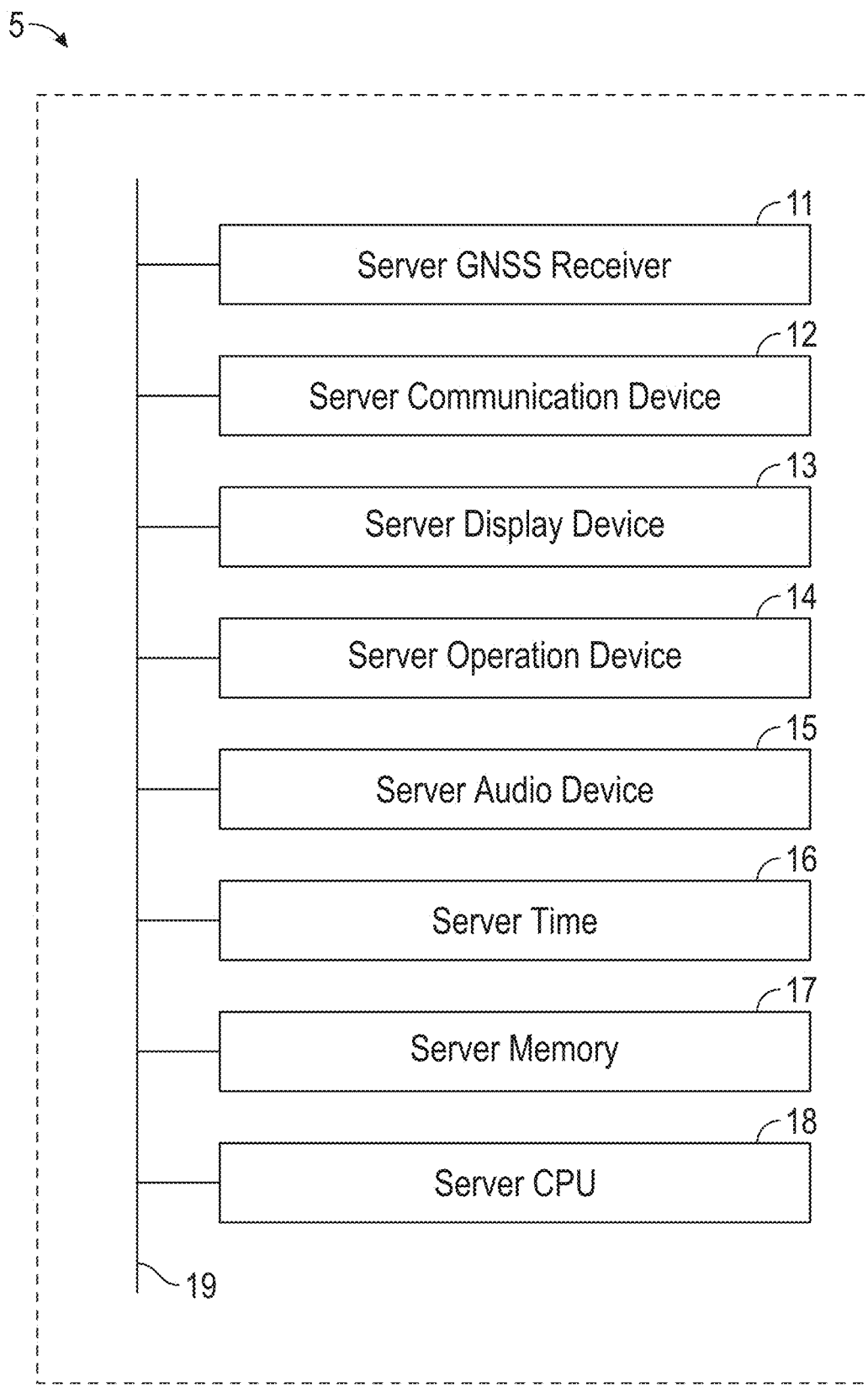
FIG. 3 is a configuration diagram of the server apparatus in FIG. 1.

FIG. 3 is a configuration diagram of the server apparatus 5 in FIG. 1.

The server apparatus 5 in FIG. 3 includes a server timer 16, a server memory 17, a server central processing unit (CPU) 18, and a server bus 19 that couples them together. In addition, for example, a server GNSS receiver 11, a server communication device 12, a server display device 13, a server operation device 14, and a server audio device 15 may be coupled to the server bus 19.

The server communication device 12 is coupled to the communication network 4 of the communication network system 6. The server communication device 12 transmits and receives information to and from other devices coupled to the communication network 4, e.g., the automobile 2 and the base stations 3, through the communication network 4.

The server GNSS receiver 11 receives radio waves of GNSS satellites 110 illustrated in FIG. 1 and obtains the current time.

The server display device 13 outputs information from the server apparatus 5 by displaying the information. The server display device 13 may be, for example, a liquid crystal monitor. The server display device 13 may serve as an output unit that outputs an image, in the server apparatus 5.

The server operation device 14 is a device to be operated by the operator, in the server apparatus 5. The server operation device 14 may be, for example, a keyboard, a touch panel, etc.

The server audio device 15 is a device to be used by the operator to make a call, in the server apparatus 5. The server audio device 15 may include, for example, a speaker and a microphone.

The server timer 16 measures time or the time. The time at the server timer 16 may be calibrated based on the current time to be acquired by the server GNSS receiver 11.

The server memory 17 holds programs to be executed by the server CPU 18 and various kinds of information. The server memory 17 may include, for example, a semiconductor memory, an HDD, etc. Examples of the semiconductor memory include volatile memories such as a RAM and non-volatile memories such as a ROM and an SSD. The volatile memories temporarily hold information, and are suitable for holding, for example, personal information.

The server CPU 18 reads the programs held in the server memory 17 and executes the programs. Thus, the server CPU 18 serves as a server controller that controls the entire operation of the server apparatus 5.

The server CPU 18 serving as the server controller may perform, for example, a management control to allow the server memory 17 to temporarily hold personal information. For example, the server CPU 18 preferably deletes personal information from the server memory 17 after an end of provision of the relevant vehicle service.

Moreover, the server CPU 18 may perform a management control of information transmission and reception to and from the automobile 2 with the use of the server communication device 12. For example, when the server communication device 12 receives information from the automobile 2, the server CPU 18 may perform a control in accordance with the received information, e.g., a control for the vehicle service. This makes it possible for the server apparatus 5 to receive the information from the automobile 2 and provide the vehicle service based on the received information.

Figure 4:
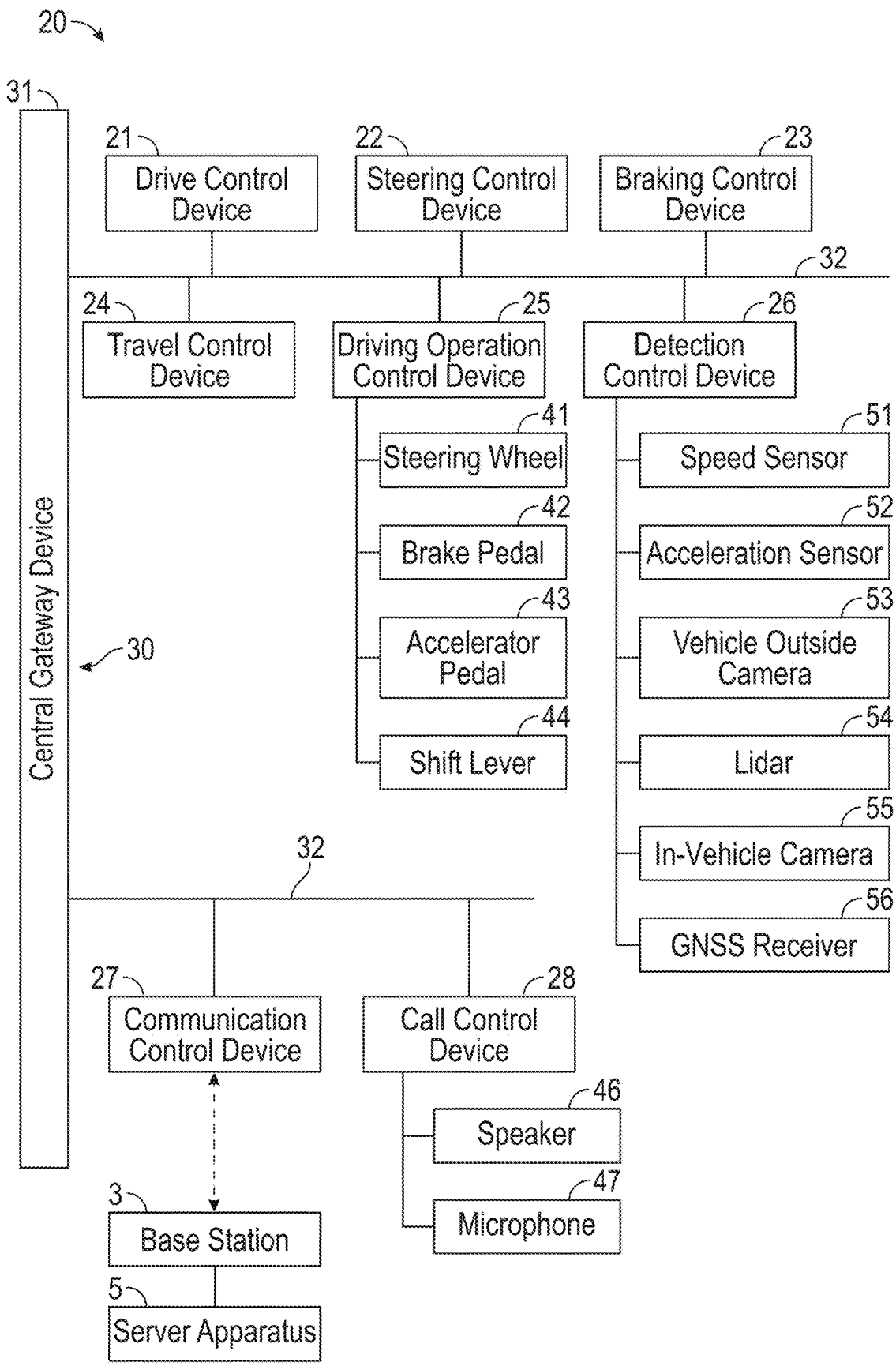
FIG. 4 is a configuration diagram of a control system of the automobile in FIG. 1.

FIG. 4 is a configuration diagram of a control system 20 of the automobile 2 in FIG. 1.

The control system 20 of the automobile 2 in FIG. 4 includes a vehicle network 30 and multiple control devices coupled to the vehicle network 30. FIG. 4 illustrates, as examples of the control devices, a drive control device 21, a steering control device 22, a braking control device 23, a travel control device 24, a driving operation control device 25, a detection control device 26, a communication control device 27, and a call control device 28. Other examples of the control devices of the automobile 2 may include, for example, an air-conditioning control device, an occupant monitoring control device, and a driving position control device.

The vehicle network 30 may comply with, for example, standards such as the controller area network (CAN) and the local interconnect network (LIN) employed in the automobile 2. Such a vehicle network 30 includes multiple bus cables 32 and a central gateway device 31. To the bus cables 32, the control devices are coupled. The central gateway device 31 serves as a relay device to which the bus cables 32 are coupled. The central gateway device 31 controls routing between the control devices through the bus cables 32. This makes it possible for each of the control devices to transmit and receive information to and from another of the control devices coupled to a different one of the bus cables 32.

To the driving operation control device 25, operation members such as a steering wheel 41, a brake pedal 42, an accelerator pedal 43, and a shift lever 44 are coupled. The operation members are operated by the driver to allow the automobile 2 to travel. The driving operation control device 25 detects an operation by the driver on the operation members, generates operation information corresponding to the operation, and outputs the operation information to the other control devices through the vehicle network 30.

The travel control device 24 controls travel of the automobile 2. For example, the travel control device 24 acquires the operation information from the driving operation control device 25 through the vehicle network 30. The travel control device 24 generates drive information, steering information, and braking information corresponding to the acquired information, and outputs the drive information, the steering information, and the braking information to the drive control device 21, the steering control device 22, and the braking control device 23 through the vehicle network 30. At this occasion, the travel control device 24 may generate the drive information, the steering information, and the braking information corresponding to the operation information as they are, or alternatively, the travel control device 24 may generate the drive information, the steering information, and the braking information adjusted to assist with the operation. Moreover, the travel control device 24 may generate drive information, steering information, and braking information for automatic travel that are not caused by an operation by the occupant.

The drive control device 21 acquires the drive information from the vehicle network 30, and controls unillustrated power sources of the automobile 2 such as an engine, a motor, and a transmission, to control magnitude and balance of a drive force of the automobile 2.

The steering control device 22 acquires the steering information from the vehicle network 30, and controls, for example, an unillustrated steering motor of the automobile 2, to control a direction of travel.

The braking control device 23 acquires the braking information from the vehicle network 30, and controls an unillustrated braking member and an unillustrated motor of the automobile 2, to control braking of the automobile 2.

The communication control device 27 communicates with one of the base stations 3 near the automobile 2 to establish a wireless communication path. The communication control device 27 transmits and receives information to and from, for example, the server apparatus 5 with the use of the wireless communication path established between the communication control device 27 and the base station 3.

To the call control device 28, a speaker 46 and a microphone 47 are coupled. The speaker 46 and the microphone 47 are used by the occupant of the automobile 2 to make a call with, for example, the operator of the server apparatus 5.

To the detection control device 26, various sensor members provided in the automobile 2 are coupled. FIG. 4 illustrates, as examples of the sensor members, a speed sensor 51, an acceleration sensor 52, a vehicle outside camera 53, a Lidar 54, the in-vehicle camera 55, and a GNSS receiver 56.

The speed sensor 51 detects a speed of the automobile 2 traveling for movement.

The acceleration sensor 52 detects an acceleration rate of the automobile 2 traveling for movement.

The vehicle outside camera 53 is a camera that captures surroundings outside the automobile 2. For example, the vehicle outside camera 53 may be a 360-degree camera that captures the entire surroundings outside the automobile 2, or alternatively, the vehicle outside camera 53 may be multiple cameras that separately capture the surroundings outside the automobile 2.

The Lidar 54 is a sensor that detects the surroundings outside the automobile 2 by using a signal such as infrared rays. The Lidar 54 generates space information regarding an outside of the automobile 2 based on reflected waves of the infrared rays.

The GNSS receiver 56 receives the radio waves of the GNSS satellites 110 illustrated in FIG. 1 and generates the current time and a current position of the automobile 2 in which the GNSS receiver 56 is provided. The GNSS satellites 110 may include a zenith satellite. The GNSS receiver 56 may also be configured to receive radio waves from a transmitter fixedly installed on the ground.

The in-vehicle camera 55 is a camera that captures an inside of the automobile 2 in which the occupant such as the driver rides. Here, the in-vehicle camera 55 may be a wide-angle camera configured to capture the driver and the assistant riding in the automobile 2 in one image. Such a wide-angle camera that captures multiple occupants riding in the automobile 2 is preferably provided in a center portion of the automobile 2 in the vehicle width direction, e.g., in a center portion of a dashboard.

The detection control device 26 outputs detection information by the sensor members and information generated based on the detection information, to the other control devices through the vehicle network 30.

For example, the detection control device 26 may record, in advance in its memory 64, information regarding a captured image of the face of the occupant by the in-vehicle camera 55. The detection control device 26 may compare the information with the currently captured image by the in-vehicle camera 55 to identify the occupant riding in the automobile 2. In this case, the detection control device 26 may output the information regarding the identified occupant to the other control devices through the vehicle network 30 as the information generated based on the detection information. Moreover, the detection control device 26 may repeatedly acquire the latest captured image by the in-vehicle camera 55 to monitor the state of the occupant. There is possibility that the occupant can feel ill while driving. Upon detecting such a change in the state of the occupant, the detection control device 26 may transmit a request for the emergency response from the communication control device 27 to the server apparatus 5. Such a detection control device 26 serves as an occupant monitoring control device.

Figure 5:
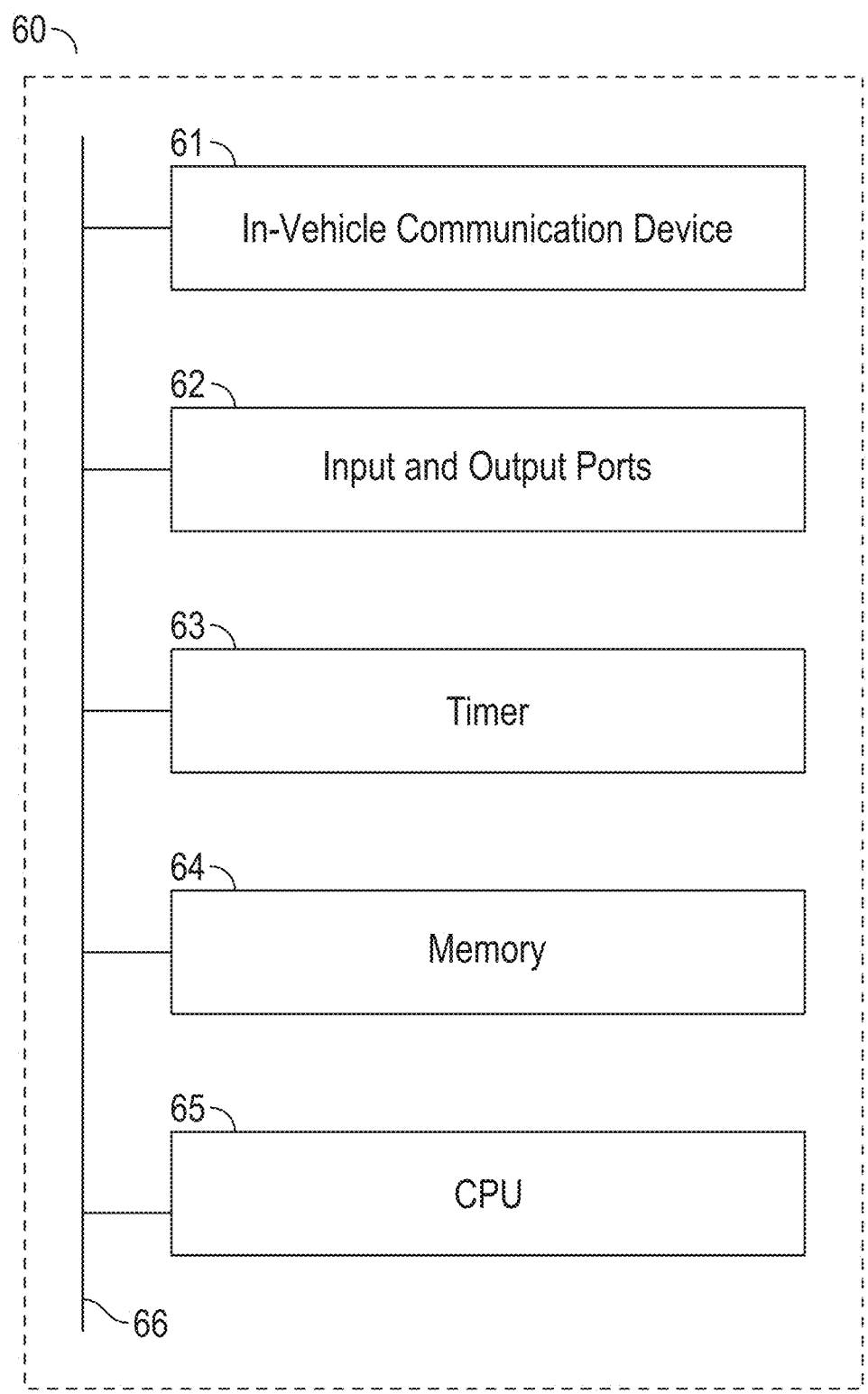
FIG. 5 is a configuration diagram of various control devices in FIG. 4.

FIG. 5 is a configuration diagram of various control devices 60 in FIG. 4.

For example, the communication control device 27 in FIG. 4 may have the configuration in FIG. 5.

The control device 60 in FIG. 5 includes an in-vehicle communication device 61, input and output ports 62, a timer 63, the memory 64, a central processing unit (CPU) 65, and an internal bus 66 that couples them together.

The in-vehicle communication device 61 is coupled to the vehicle network 30. The in-vehicle communication device 61 is supplied with information from, and outputs information to, the in-vehicle communication devices 61 of the other control devices through the vehicle network 30.

To the input and output ports 62, various members are coupled to be coupled to the control device 60. In the case of the communication control device 27, a communication device for communication with the base station 3 may be coupled.

The timer 63 measures time or the time. The time at the timer 63 may be calibrated based on the current time to be acquired by the GNSS receiver 56. This contributes to highly precise matching between the time at the server apparatus 5 and the time at the automobile 2.

The memory 64 holds programs to be executed by the CPU 65 and various kinds of information. The memory 64 may include, for example, a semiconductor memory, a HDD, etc. Examples of the semiconductor memory include volatile memories such as a RAM and non-volatile memories such as a ROM and a SSD.

The CPU 65 reads the programs held in the memory 64 and executes the programs. Thus, the CPU 65 serves as a vehicle controller that controls the entire operation of the control device 60 in which the CPU 65 is provided.

Figure 6:
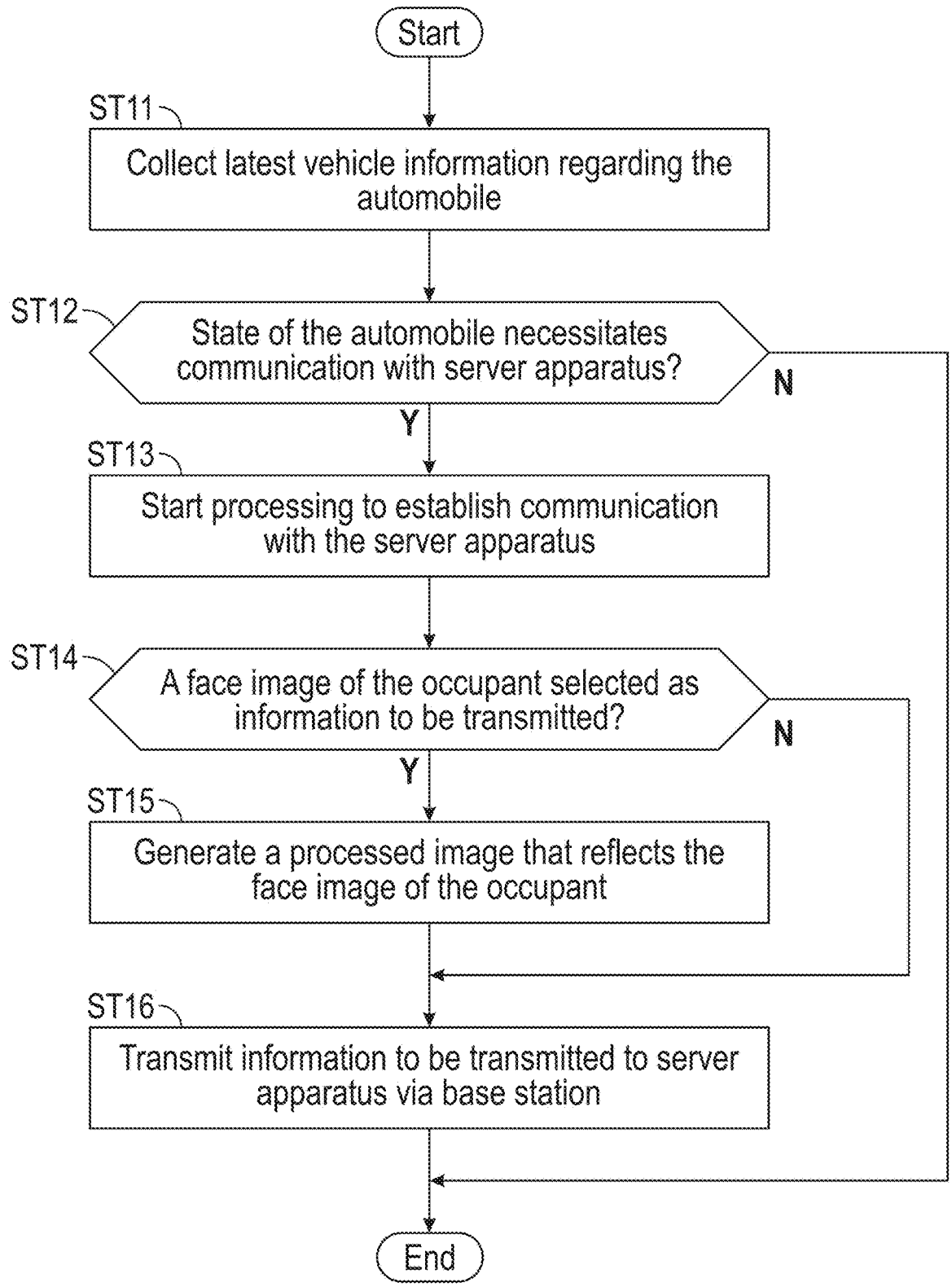
FIG. 6 is a flowchart of an information transmission control for the emergency response service, by the control system of the automobile in FIG. 4.

FIG. 6 is a flowchart of an information transmission control for the emergency response service, by the control system 20 of the automobile 2 in FIG. 4.

Here, description is given on an assumption that the CPU 65 of the communication control device 27 executes the transmission control in FIG. 6. The CPU 65 of any of the various control devices 60 included in the control system 20 of the automobile 2 in FIG. 4 may execute the transmission control in FIG. 6. Moreover, the multiple CPUs 65 of the control system 20 may cooperate to execute the transmission control in FIG. 6. The CPU 65 of the communication control device 27 repeatedly executes the transmission control in FIG. 6, for example, with the occupant riding in the automobile 2.

In step ST11, the CPU 65 collects latest vehicle information regarding the automobile 2. Here, the vehicle information may be any information collectable from each unit of the automobile 2. The vehicle information may include, for example, information indicating a travel state or a malfunction of the automobile 2, and information indicating the state or the illness of the occupant. The information indicating the state of the occupant is, for example, the captured image by the in-vehicle camera 55. The captured image by the in-vehicle camera 55 may include the occupants, e.g., the driver and the assistant, riding in the automobile 2.

In step ST12, the CPU 65 determines whether or not the state of the automobile 2 determinable based on the vehicle information necessitates communication with the server apparatus 5. When the automobile 2 has a malfunction or the occupant feels ill, when the automobile 2 is being involved in an accident, or when the occupant has made a request by, for example, operating an unillustrated button, the CPU 65 may determine, based on these pieces of information, that the communication with the server apparatus 5 is necessary. In this case, the CPU 65 causes the process to proceed to step ST13 to establish the communication with the server apparatus 5. When the CPU 65 does not determine that the communication with the server apparatus 5 is necessary, the CPU 65 ends the control.

In step ST13, the CPU 65 starts processing to establish communication with the server apparatus 5. The CPU 65 first selects information to be transmitted from the latest vehicle information collected. When the automobile 2 has a malfunction, the CPU 65 may select various kinds of information regarding the automobile 2 as the information to be transmitted. When the occupant feels ill, or when the occupant has operated the button, the CPU 65 may select various kinds of information regarding the occupant as the information to be transmitted. When the automobile 2 is being involved in an accident, the CPU 65 may select various kinds of information regarding the automobile 2 and the occupant as the information to be transmitted. When selecting various kinds of information regarding the occupant, the CPU 65 may sometimes select the captured image by the in-vehicle camera 55 including the face of the occupant.

In step ST14, the CPU 65 determines whether or not a face image of the occupant has been selected as the information to be transmitted. For example, when the captured image by the in-vehicle camera 55 including the face of the occupant has been selected as the information to be transmitted, the CPU 65 determines that the face image of the occupant has been selected, and causes the process to proceed to step ST15. When the captured image by the in-vehicle camera 55 including the face of the occupant has not been selected as the information to be transmitted, the CPU 65 causes the process to skip step ST15 and proceed to step ST16.

In step ST15, the CPU 65 generates a processed image that reflects the face image of the occupant, based on the image including the face of the occupant selected as the information to be transmitted. This processing control will be described later. Thus, the CPU 65 generates a processed face image that reflects the face image of the occupant, based on, for example, the captured image by the in-vehicle camera 55 including the face of the occupant selected as the information to be transmitted. The CPU 65 changes the face image of the occupant to be transmitted, from the captured image by the in-vehicle camera 55 to the processed face image.

In step ST16, the CPU 65 transmits the information to be transmitted, from the communication control device 27 to the server apparatus 5 through the base station 3. In a case where the processed image that reflects the face image of the occupant has been generated in step ST15, the captured image by the in-vehicle camera 55 is not transmitted. Thus, the information to be transmitted from the automobile 2 to the server apparatus 5 does not include the face image itself of the occupant actually riding in the automobile 2. This prevents the face image of the occupant actually riding in the automobile 2 from being transmitted to the server apparatus 5 through the communication network system 6, and allows the face image of the occupant to be protected as personal information.

Moreover, in the server apparatus 5, the server communication device 12 receives the transmitted information from the automobile 2. The server CPU 18 of the server apparatus 5 executes the processes of steps ST3 to ST8 in FIG. 2. Thus, the server display device 13 displays the face image based on the processed image. The operator observes and determines the state of the occupant of the automobile 2, based on the displayed face image based on the processed image. Moreover, the operator may establish a communication path with the automobile 2 and directly talk with the occupant as necessary. It is possible for the operator to favorably determine the state of the automobile 2 and the occupant, and provide an appropriate vehicle service.

Figure 7:
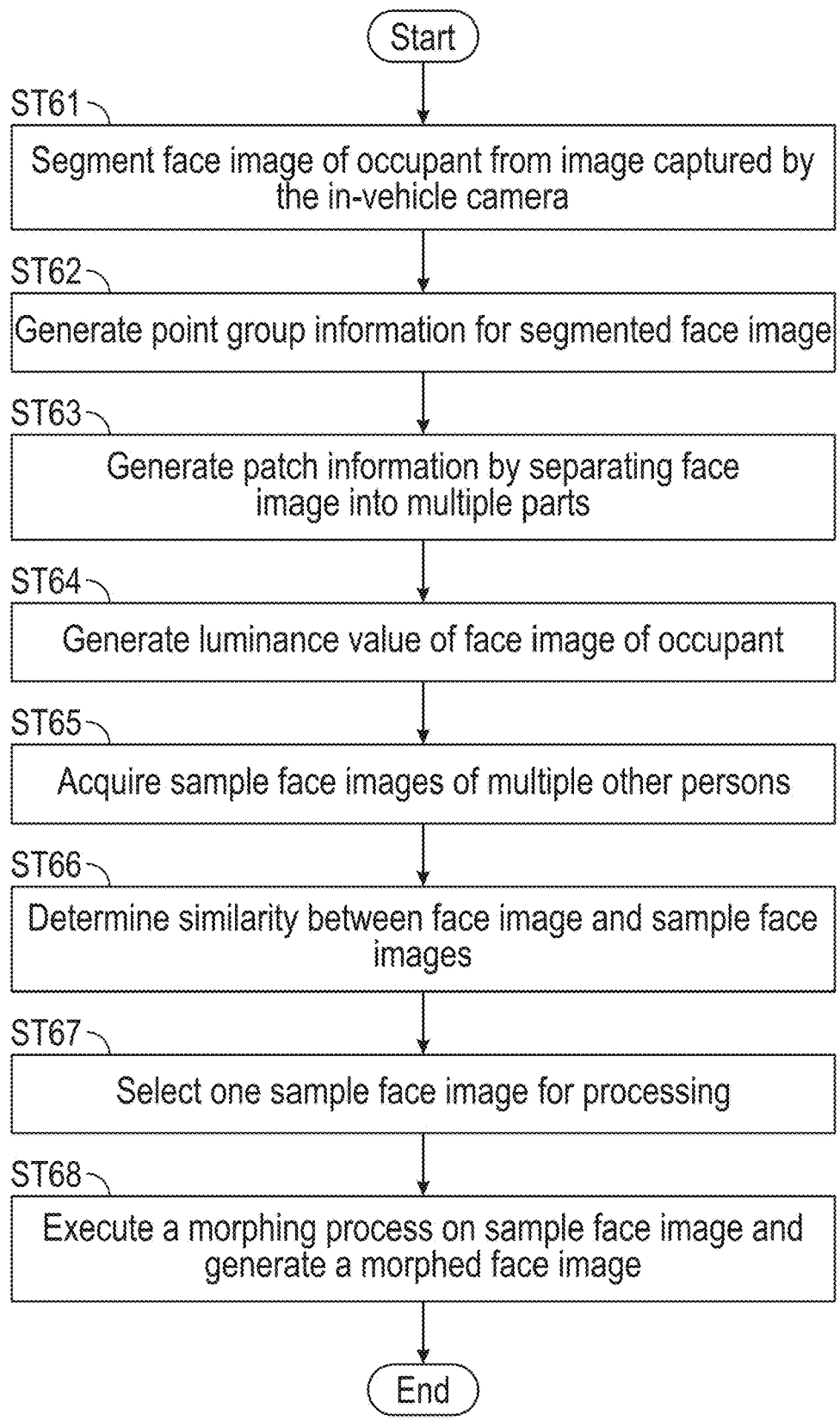
FIG. 7 is a detailed flowchart of a processed image generation control in step ST15 in FIG. 6.

FIG. 7 is a detailed flowchart of a processed image generation control in step ST15 in FIG. 6.

In step ST61, the CPU 65 segments the face image, i.e., the captured region of the face of the occupant, from the captured image by the in-vehicle camera 55 already acquired as the vehicle information acquired from each unit of the automobile 2.

Here, the face image of the occupant refers to the image including the image component of the face of the occupant.

In step ST62, the CPU 65 generates point group information regarding the segmented face image of the occupant. The point group information indicates the face of the occupant. Here, the point group information includes multiple points indicating a position of an outline of the face of the occupant in the face image of the occupant, and multiple points indicating positions of elements such as the eyebrows, the eyes, the nose, and the mouth in the face of the occupant. In addition, for example, the point group information may include multiple points indicating a position of an outline of the entire head including the face of the occupant. Moreover, the multiple points indicating the positions of the elements of the face preferably has a combination that is able to indicate a shape and a range of each of the elements. For example, the multiple points for the eyebrows preferably has a combination indicating positions of both ends of each eyebrow and a position of the midpoint of each eyebrow. The multiple points for the eyes preferably has a combination indicating positions of the inner corners of the eyes, positions of the outer corners of the eyes, positions of the upper eyelids, and positions of the lower eyelids. The multiple points for the nose preferably has a combination indicating the upper end, the lower edge, and the left and right edges of the nose, and the apex of the nose. The multiple points for the mouth preferably has a combination indicating the outer circumference of the upper lip and the outer circumference of the lower lip.

The point group information regarding the multiple points in the face of the occupant may be generated by landmark detection processing.

In step ST63, the CPU 65 generates patch information that separates the face image into multiple parts. At this occasion, the CPU 65 may generate the patch information that separates the face image, by using the point group information generated in step ST62 as a reference for image separation. The CPU 65 may generate multiple pieces of the patch information regarding the face image by, for example, a Delaunay method. In the Delaunay method, the face image is separated into multiple parts to obtain triangular patch regions.

In step ST64, the CPU 65 generates a luminance value of the face image of the occupant. The CPU 65 may generate, for example, an average luminance value and a representative luminance value of a face portion regarding the face image of the occupant.

In step ST65, the CPU 65 acquires multiple sample face images regarding multiple other persons, to be used instead of the face of the occupant. Here, the other person may be a person different from the relevant occupant, preferably a person unrelated to the occupant. Examples of a face image of an unrelated person include a face image resulting from synthesizing face images of multiple real persons, and a mechanically generated face image of an unreal person. As the multiple sample face images, basically, it is preferable to acquire face images of multiple other persons that differ in, for example, skin color and have different luminance values from each other. A range of selection is wider when the sample face images are different from each other than when the sample face images are similar to each other.

Note that it is desirable that the sample face image to be acquired here be a sample face image with which the point group information, the patch information, and the luminance value generated in steps ST62 to ST64 regarding the face image of the occupant are already associated. However, when these pieces of information are not associated, the CPU 65 may execute the processes of steps ST62 to ST64 also for the acquired sample face image, to generate the point group information, the patch information, and the luminance value regarding the sample face image.

In step ST66, the CPU 65 determines a degree of similarity between the face image of the occupant and the acquired multiple sample face images. For example, the CPU 65 may compare the luminance values of the acquired multiple sample face images with the luminance value identified regarding the face image of the occupant, and determine the degree of similarity of each of the multiple sample face images. Here, the CPU 65 may determine the degree of similarity by comparison based on the luminance value identified regarding the entire face portion.

In step ST67, the CPU 65 selects one sample face image to be used for processing, from the acquired multiple sample face images. For example, the CPU 65 may select a sample face image whose difference in luminance value from the face image of the occupant is smallest and degree of similarity is highest, as the one sample face image to be used for processing.

In step ST68, the CPU 65 executes a morphing process on the sample face image, to generate a morphed face image of the sample face image. At this occasion, the CPU 65 executes the morphing process on the sample face image, to make the point group information and the patch information of the sample face image closer to the point group information and the patch information generated regarding the occupant.

Thereafter, the CPU 65 ends the control, and causes the process to return to FIG. 7. In a case where the morphed face image subjected to the morphing process to become closer to the face of the occupant has been obtained by the process in FIG. 7, the CPU 65 uses the morphed face image as the face image of the occupant to be transmitted. In step ST16, the CPU 65 transmits the face image of the other person processed by the morphing process to the server apparatus 5, instead of the face image of the occupant of the automobile 2.

Note that the CPU 65 may transmit, to the server apparatus 5, an image in which an image region of the face of the occupant in the captured image by the in-vehicle camera 55 is substituted by the morphed face image processed by the morphing process.

Figure 8:
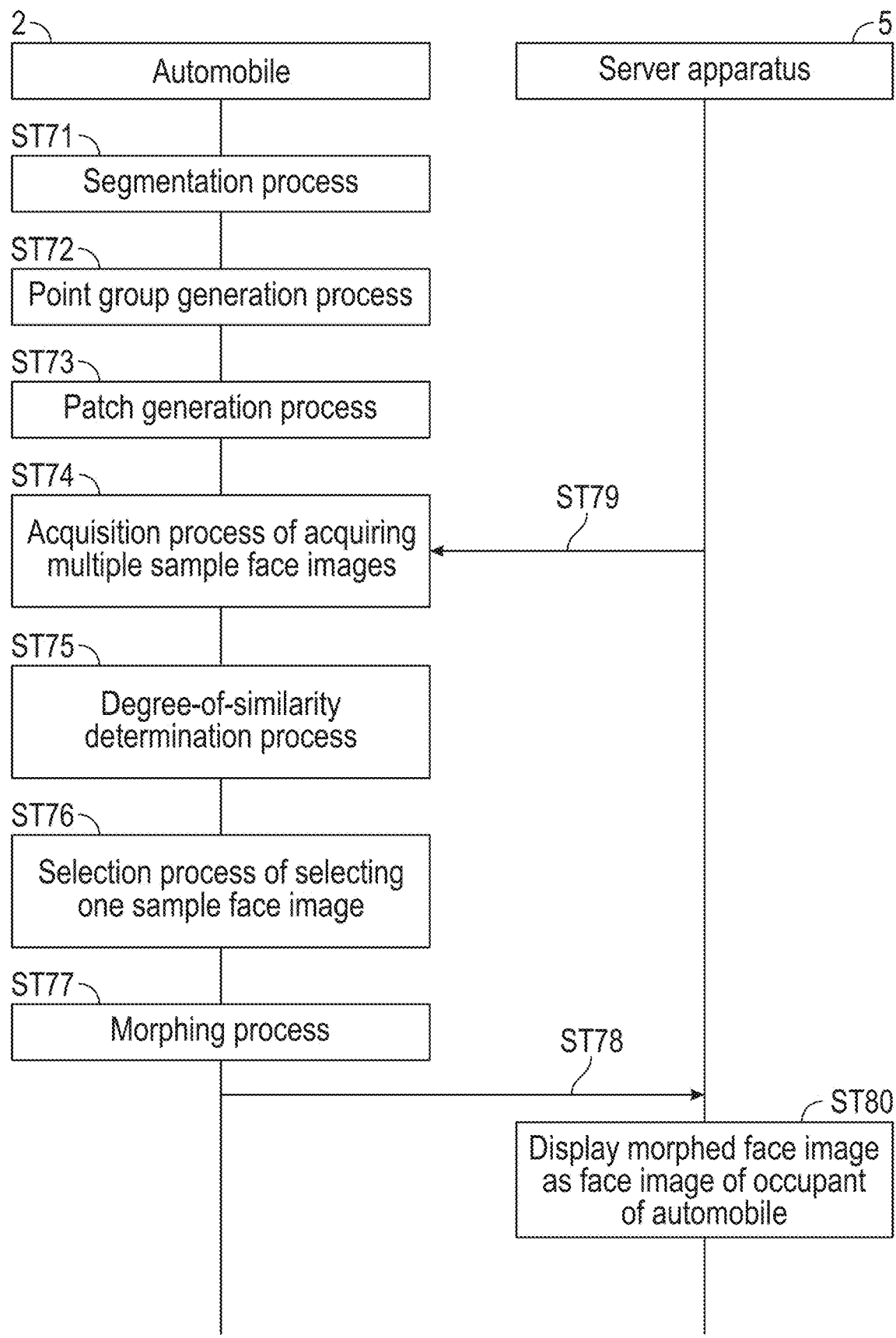
FIG. 8 is an explanatory diagram of a face image processing procedure in the first embodiment.

FIG. 8 is an explanatory diagram of a face image processing procedure in the first embodiment.

FIG. 8 illustrates the automobile 2 and the server apparatus 5. Time flows from top to bottom.

In the case of the present embodiment, after an unillustrated occupant image acquisition process, the CPU 65 of the automobile 2 executes, in steps ST71 to ST77, a segmentation process, a point group generation process, a patch generation process, an acquisition process of acquiring multiple sample face images, a degree-of-similarity determination process, a selection process of selecting one sample face image, and the morphing process. In step ST78, the CPU 65 transmits a morphed face image 100 to the server apparatus 5, as the face image of the occupant of the automobile 2.

In this case, in step ST79, the server CPU 18 of the server apparatus 5 transmits the multiple sample face images to the automobile 2.

Moreover, in step ST80, the server CPU 18 of the server apparatus 5 causes the server display device 13 to output the morphed face image 100 generated by the morphing process and received from the automobile 2, as the face image of the occupant of the automobile 2.

This makes it possible for the CPU 65 of the automobile 2 to select one sample face image from the multiple sample face images acquired from the server apparatus 5, generate the morphed face image 100, and transmit the morphed face image 100 to the server apparatus 5.

Note that, unlike such a processing procedure in the present embodiment, the CPU 65 of the automobile 2 may execute some of the processes of steps ST71 to ST77 and transmit processed information, and the rest of the processes may be executed by the server CPU 18 of the server apparatus 5. Even in this case, refraining from transmitting the face image of the occupant itself from the automobile 2 to the server apparatus 5 prevents personal information from being easily transmitted from the automobile 2 to the outside.

Description is given next of the processed image generation control regarding the face image of the occupant of the automobile 2, with reference to a specific example.

FIG. 9 is an explanatory diagram of an example of a captured image 70 by the in-vehicle camera 55 in FIG. 4.

Because the in-vehicle camera 55 in FIG. 4 is a wide-angle camera, the captured image 70 by the in-vehicle camera 55 in FIG. 9 includes multiple occupants riding in the automobile 2, e.g., the driver and the assistant. The head of each occupant can move in the vehicle, but the entire head of each occupant fits in the captured image 70.

In this case, in step ST61 in FIG. 7, the CPU 65 segments, for example, the captured region including the face of the driver indicated by a frame of a broken line in FIG. 7, as a face image 71 of the driver.

FIG. 10 is an explanatory diagram of an example of the face image 71 as the captured region of the face of the driver segmented from the captured image 70 in FIG. 9.

In the face image 71 of the driver in FIG. 10, the entire head of the driver fits without being trimmed by an outer peripheral edge of the image.

Note that the CPU 65 may segment the face image 71 of the driver to include not the entire head of the driver but a region from the eyebrows to the chin tip of the driver. Even in this case, the face image 71 of the driver includes the image component of the face of the driver. As described later, the CPU 65 is configured to generate the point group information regarding the elements in the region from the eyebrows to the chin tip in the face of the driver.

However, even when a portion of the head of the driver is trimmed in this way, the CPU 65 segments the face of the driver as the face image 71 of the driver, to leave margins 77 of a predetermined width on the right and left sides of the region of the face of the driver. The margins 77 are useful in a processing process described later.

FIG. 11 is an explanatory diagram of an example of the point group information to be generated regarding the face image 71 of the driver in FIG. 10.

In step ST62 in FIG. 7, the CPU 65 is configured to generate the point group information as illustrated in FIG. 11 regarding the face image 71 of the driver in FIG. 10.

The point group information in FIG. 11 includes points 72 for the face itself, and points 73 for the outer peripheral edge as an outline of the face image itself. The points 72 may include points indicating a position of the outline of the face of the driver, and points indicating the positions of the elements, e.g., the eyebrows, the eyes, the nose, and the mouth in the face of the driver.

Here, the points 73 for the outer peripheral edge of the image are provided at each corner of the outer peripheral edge of the rectangular image, and a midpoint of each side of the rectangular image.

Because the face image 71 of the driver includes the margins 77 on the right and left sides, the points 73 for the outer peripheral edge of the image are spaced away from the points 72 for the face of the driver itself.

Moreover, the points 73 for the outer peripheral edge of the image are arranged to surround and enclose all the points 72 for the face of the driver itself.

FIG. 12 is an explanatory diagram of an example of the patch information to be generated regarding the face image 71 of the driver in FIG. 10.

In the patch information in FIG. 12, each patch has a triangle shape.

In step ST63 in FIG. 7, the CPU 65 may generate the patch information in FIG. 12 regarding the face image 71 of the driver in FIG. 10 by the Delaunay method.

The patch information in FIG. 12 includes patches 74 for the face of the driver itself and patches 75 outside the face of the driver. The CPU 65 is configured to separate the entire face image into multiple triangular patches as illustrated in FIG. 12 by a process of the Delaunay method using the points 72 for the face of the driver itself and the points 73 arranged along the outer peripheral edge of the image. The presence of the margins 77 on the left and right sides of the face image 71 of the driver makes it possible for the CPU 65 to separate the entire face image into the triangular patches without affecting the separation of the face itself into the patches.

In contrast, for example, if there are no margins 77 on the left and right sides of the face image 71 of the driver, the CPU 65 may easily separate the face image into patches by the Delaunay method differently from FIG. 12. For example, the CPU 65 may carry out the separation assuming that the points on the right and left outer peripheral edges of the image are part of the outline of the face. This results in high possibility of unfavorable patch separation as the patch information regarding the face. To avoid such a situation, in the present embodiment, as illustrated in FIG. 10 and in FIG. 13 described later, the CPU 65 segments the face image, to allow a width of the face to be about one-third of a width of the face image. For example, the CPU 65 may provide a margin of a width of at least 25% or more of the width of the face image on each of the left and right sides of the face. This makes it possible for the CPU 65 to generate the favorable patch information regarding the face as illustrated in FIG. 12 by the Delaunay method. The CPU 65 preferably segments, as the captured region of the face of the driver, a captured region of a range larger than the face of the driver at least in a width direction of the face of the driver.

As described, in the segmentation process, the CPU 65 segments the captured region of the range larger than the face of the occupant at least in the width direction of the face of the occupant, from the captured image 70 acquired from the in-vehicle camera 55, to generate the face image as the captured region of the face of the occupant. In the point group generation process, the CPU 65 generates the point group information regarding the outer peripheral edge of the segmented captured region of the face of the occupant. The point group information includes multiple points along the outer peripheral edge including the position spaced away from the face of the occupant. In the patch generation process, the CPU 65 generates the patch information with the use of the point group information regarding the points along the outer peripheral edge of the segmented captured region of the face of the occupant, together with the point group information regarding the face and indicating the position of the outline of the face and the positions of the elements of the face, as the reference for the image separation. The patch information separates the segmented captured region of the face of the occupant into triangle-based units.

Description is given next, with reference to FIGS. 13 to 15, of the information regarding the sample face image 91 to be acquired by the CPU 65 in step ST65 in FIG. 7.

FIG. 13 is an explanatory diagram of an example of a combination of multiple sample face images 91 and 92.

FIG. 13 illustrates a face image group 90 to be acquired by the CPU 65. The face image group 90 in FIG. 13 includes the sample face image 91 of a fair-skinned first other person, and the sample face image 92 of a dark-skinned second other person. The sample face image 91 of the first other person and the sample face image 92 of the dark-skinned second other person have different luminance values from each other.

By determination of similarity based on the luminance value, the CPU 65 selects the sample face image 91 of the first other person whose difference in luminance value from the face image 71 of the driver in FIG. 10 is small, from the face image group 90 in FIG. 13.

FIG. 14 is an explanatory diagram of an example of the point group information to be generated regarding the sample face image 91 of the first other person selected in FIG. 13.

FIG. 15 is an explanatory diagram of an example of the patch information to be generated regarding the sample face image 91 of the first other person selected in FIG. 13.

In FIG. 13, the entire head of the other person fits in the sample face image 91 of the first other person, with a margin around the head, without being trimmed by an outer peripheral edge of the image.

In this case, as illustrated in FIG. 14, the CPU 65 may generate the point group information regarding the sample face image 91 of the first other person by a point group generation process for the sample face image 91 of the first other person. The point group information regarding the sample face image 91 of the first other person in this case includes points 82 for the face itself and points 83 along the outer peripheral edge of the face image. The points 82 indicate the outline of the face and the positions of the elements of the face.

Moreover, as illustrated in FIG. 15, the CPU 65 may generate the patch information by a patch generation process for the sample face image 91 of the first other person. The patch information separates the sample face image 91 of the first other person into triangle-based units. The patch information may include patches 84 and patches 85. The patches 84 separate the face of the first other person itself. The patches 85 separate an outside of the face of the first other person.

The CPU 65 may generate the point group information in FIG. 14 and the patch information in FIG. 15 regarding the sample face image 91 of the first other person in FIG. 13 by a similar process to the process for the face image 71 of the driver in FIG. 10.

The sample face image 91 of the first other person in FIGS. 13 to 15 may be recorded in the memory 64, as information regarding the face image group 90, before the process of step ST65 in FIG. 7. Alternatively, the CPU 65 may acquire, in the process of step ST65 in FIG. 7, the information regarding the face image group 90 including information regarding the sample face image 91 of the first other person in FIGS. 13 to 15, from the server apparatus 5. The information regarding the face image group 90 to be recorded in the memory 64 may be information acquired in advance from the server apparatus 5.

FIG. 16 is an explanatory diagram of an example of the morphed face image 100 to be transmitted from the automobile 2 to the outside as the face image of the occupant. The morphed face image 100 is an image to be transmitted from the automobile 2 to the outside, instead of the face image 71 of the driver.

In step ST68 in FIG. 7, the CPU 65 may execute the morphing process on the sample face image 91 of the first other person.

In the morphing process, the CPU 65 may use the information in FIGS. 13 to 15 regarding the sample face image 91 and the information in FIGS. 10 to 12 regarding the face image 71 of the driver.

The points 72 and 73 included in the point group information regarding the face image 71 of the driver in FIG. 11 and the points 82 and 83 included in the point group information regarding the sample face image 91 in FIG. 14 correspond to each other.

The patches 74 and 75 included in the patch information regarding the face image 71 of the driver in FIG. 12 and the patches 84 and 85 included in the patch information regarding the sample face image 91 in FIG. 15 correspond to each other.

As described, the point group information and the patch information regarding the sample face image 91 are generated to favorably correspond to the point group information and the patch information regarding the face image 71 of the driver.

In this case, for example, the CPU 65 may bring the positions in the image of the points 82 and 83 in the point group information regarding the sample face image 91 closer to the positions in the image of the corresponding points 72 and 73 in the point group information regarding the face image 71 of the driver.

Thus, the position and a range in the image of each of the patches 84 and 85 in the patch information regarding the sample face image 91 change to overlap with the position and a range in the image of each of the patches 74 and 75 in the patch information regarding the face image 71 of the driver.

As a result, the face of the other person in the sample face image 91 of the first other person in FIG. 13 becomes closer to the face of the driver in the face image 71 in FIG. 10.

As described, the CPU 65 executes the morphing process on the sample face image 91 to make the point group information and the patch information regarding the sample face image 91 of the other person closer to the point group information and the patch information regarding the face image 71 of the driver.

Here, when the positions in the image of the points 82 and 83 in the point group information regarding the sample face image 91 overlap respectively with the positions in the image of the points 72 and 73 in the point group information regarding the face image 71 of the driver, the sample face image 91 of the first other person is morphed at a ratio of 100%. The outline of the face, the positions and sizes of the elements of the face in the sample face image 91 may be substantially the same in position and size as those in the actual face image 71 of the driver. However, because the sample face image 91 itself to be used for the morphing process is not the one of the driver, but is of a different person, even if the morphing process is performed at the ratio of 100%, the morphed face image 100 does not become the face image 71 itself of the driver. When the ratio of morphing is 50%, as illustrated in FIG. 16, the morphed face image 100 becomes an intermediate between the face of the driver in the face image 71 in FIG. 10 and the face of the other person in the sample image 91 in FIG. 13. Even in this case, the morphed face image 100 includes features and expression of the face of the driver at the ratio of morphing.

The CPU 65 executes the morphing process, with the ratio of morphing of the sample face image 91 assuming any value. The value of the ratio of morphing may be fixed, or alternatively, the ratio of morphing may be set at any value by, for example, the driver.

The CPU 65 transmits the morphed face image 100 generated by the morphing process to the server apparatus 5, instead of the captured image 70 by the in-vehicle camera 55, instead of the face image of the occupant of the automobile 2.

It is possible for the CPU 65 to protect the face image 71 of the driver as personal information, and refrain from transmitting the face image 71 itself to the outside of the automobile 2.

As described above, in the vehicle service providing system 1 according to the present embodiment, the CPU 65 of the automobile 2 executes the occupant image acquisition process, the luminance value generation process, the sample image acquisition process, the determination process, the selection process, and the morphing process. The server CPU 18 causes the server display device 13 to output the morphed face image 100 generated by the morphing process, instead of the image of the face of the occupant of the vehicle. This allows the server display device 13 to output the face image that reflects the state of the occupant, e.g., the expression of the occupant. As a result, it is possible for the operator to grasp, for example, the current actual state or the expression of the occupant based on the face image outputted. In contrast, when the image component of the face of the occupant is abstracted, substituted, or masked, it is difficult for the operator to accurately grasp, for example, the current actual state or the expression of the occupant, based on the image displayed.

In particular, in the present embodiment, a sample face image having a high degree of similarity to the luminance value of the face of the occupant is selected from the face image group 90 including sample face images of multiple other persons, instead of executing morphing of making the face image of a single fixed other person different from the occupant closer to the face of the occupant. This allows the image of the face of the occupant of the automobile 2 to be outputted from the server display device 13 of the server apparatus 5 to be a face image close to the luminance value of the face of the occupant, in accordance with the occupant. Selecting a sample face image from among combinations of sample face images having different luminance values from each other, as the sample face images 91 and 92, makes it possible to favorably select the sample face image 91 close to an actual appearance of the occupant. As a result, it is possible for the operator to grasp the appearance of the occupant and more accurately determine the state of the occupant, based on the output of the morphed face image 100 that differs between occupants, unlike a case where the face image of a single fixed other person is outputted at all times.

Moreover, the CPU 65 of the automobile 2 executes the occupant image acquisition process, the segmentation process, the point group generation process, the patch generation process, the sample image acquisition process, and the morphing process, and transmits information generated by the processes to the server apparatus 5, instead of the face image of the occupant. Hence, in the present embodiment, it is possible to refrain from transmitting the face image 71 of the occupant itself to the outside. The face image 71 of the occupant deserves protection as personal information regarding the occupant.

As described, in the present embodiment, selecting and morphing the sample face image 91 similar to the luminance value of the actual face of the occupant makes it possible to protect personal information while avoiding impairment of the convenience of the vehicle service providing system 1.

Moreover, in the present embodiment, the CPU 65 of the automobile 2 further executes the segmentation process, the point group generation process, and the patch generation process. The segmentation process segments the face image 71 as the captured region of the face of the occupant, from the captured image 70 acquired from the in-vehicle camera 55. The point group generation process generates, by the landmark detection processing, the point group information regarding the face, the point group information indicating the outline of the face and the positions of the elements of the face, in the segmented face image 71 of the occupant. The patch generation process generates the patch information with use of the generated point group information as the reference for the image separation, the patch information separating the segmented captured region of the face of the occupant into triangle-based units. In the morphing process, the CPU 65 executes morphing of making the point group information and the patch information regarding the sample face image 91 selected by the selection process closer to the point group information and the patch information generated regarding the occupant, to generate the morphed face image 100. The morphed face image 100 is made closer to the face of the occupant in terms of not only a luminance value but also, for example, a shape of the face.

Thus, it is possible to generate and output, as the morphed face image 100 corresponding to the face of the occupant, a face image that reflects not only the luminance value of the face of the occupant, but also the state of the occupant, e.g., the expression of the face of the occupant. As a result, it is possible for the operator to accurately grasp, for example, the current actual state or the expression of the occupant, based on the morphed face image 100 outputted.

Second Embodiment

Description is given next of the vehicle service providing system 1 according to a second embodiment of the invention.

In the vehicle service providing system 1 according to the present embodiment, the processed image generation control is different from that in the above-described embodiment.

Configurations and processes similar to those in the above-described embodiment are denoted by reference numerals similar to those in the above-described embodiment.

Hereinafter, description is given mainly of differences from the above-described embodiment.

Figure 17:
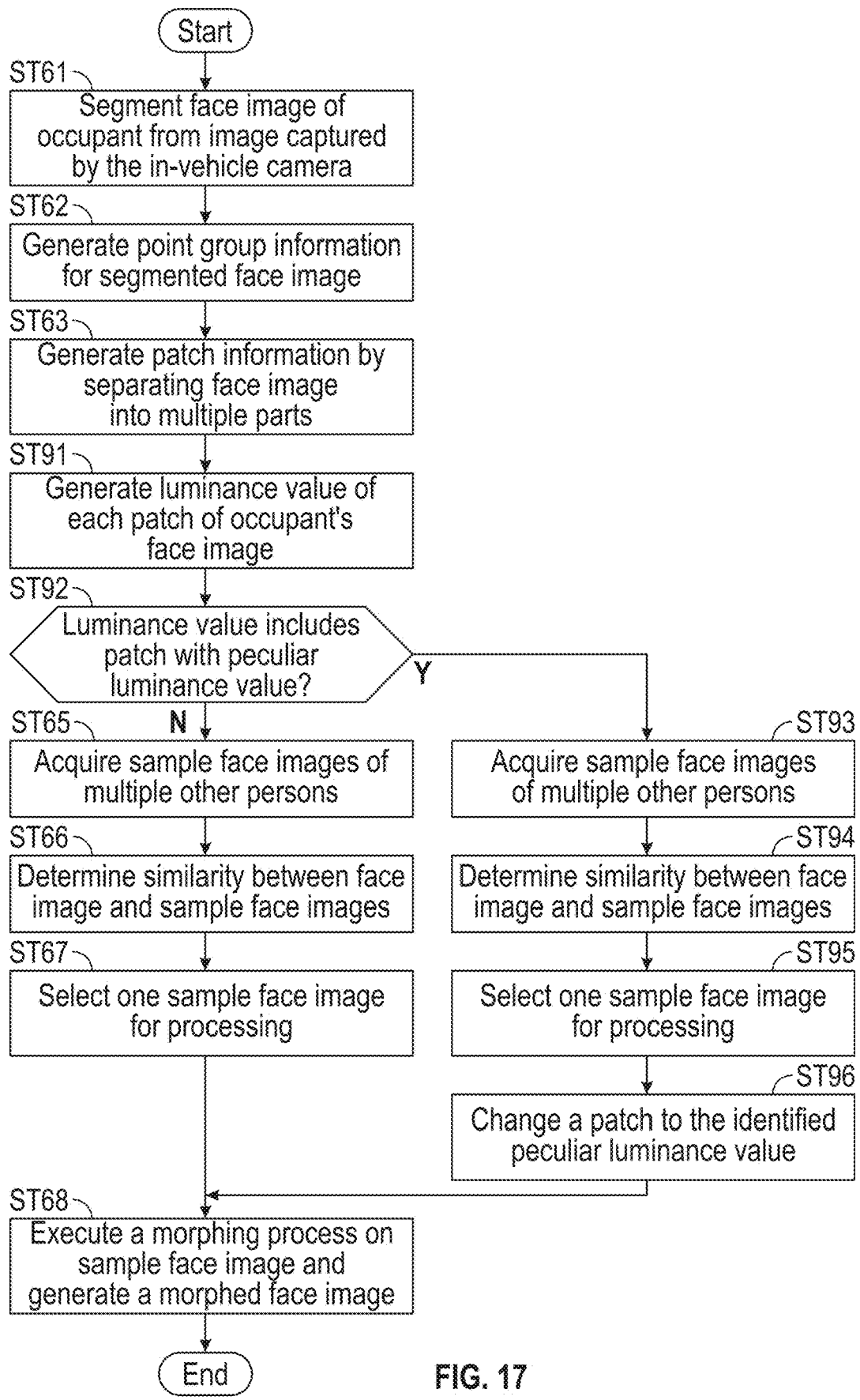
FIG. 17 is a detailed flowchart of a processed image generation control in a second embodiment of the invention.

FIG. 17 is a detailed flowchart of the processed image generation control in the second embodiment of the invention.

The CPU 65 of the communication control device 27 provided in the control system 20 of the automobile 2 may execute the processed image generation control in FIG. 17 in step ST15, when the occupant is riding in the automobile 2 and the CPU 65 is repeatedly executing the transmission control in FIG. 6.

Steps ST61 to ST63 in FIG. 17 are similar to those in FIG. 7. After step ST63, the CPU 65 causes the process to proceed to step ST91.

In step ST91, the CPU 65 generates the luminance value of each patch of the face image of the occupant. The CPU 65 preferably generates the luminance value of each patch, regarding the image region of each of multiple patches included in the patch information.

In step ST92, the CPU 65 determines whether or not the luminance value generated for each patch of the face image of the occupant in step ST91 includes a patch with a peculiar luminance value. Here, the peculiar luminance value may be, for example, a luminance value different by a predetermined threshold or more from the average luminance value of the face image of the occupant. Thus, for example, when the face of the occupant has a wound or blood on the cheek, the CPU 65 may determine a patch corresponding to the portion as a patch with a peculiar luminance value.

On the other hand, the luminance value of each portion of the face differs between elements of the face. For example, the luminance value of the eyes and the luminance value of the mouth can be greatly different from the average luminance value of the entire face. To prevent a patch for such a portion from being determined as a patch with a peculiar luminance value, the CPU 65 may determine a portion of the face to which each patch corresponds, based on, for example, attribute information regarding each patch. For a patch determined as a portion intrinsically having a peculiar luminance value, the CPU 65 may determine whether or not the patch is a patch with a peculiar luminance value, based on a determination criterion unique to each portion.

In the memory 64, the face image of the occupant may be held in advance, for example, for identification and monitoring of the occupant. In this case, the CPU 65 may compare the luminance value generated for each patch of the face image of the occupant in step ST91, with the face image held in the memory 64 in advance for the occupant, and determine a patch of a portion that differs by the threshold or more, as a patch with a peculiar luminance value.

Thus, it is possible for the CPU 65 to, as a decision process, determine whether or not a patch region defined by the patch information generated in the patch generation process includes a peculiar luminance value indicating an injury to the occupant.

If the face image of the occupant includes a patch with a peculiar luminance value, the CPU 65 causes the process to proceed to step ST93.

In contrast, if the face image of the occupant does not include a patch with a peculiar luminance value, the CPU 65 causes the process to proceed to step ST65. In this case, the CPU 65 executes the processes of steps ST65 to ST68 to generate a morphed face image, as in FIG. 7.

Thereafter, the CPU 65 ends the control, and causes the process to return to FIG. 7. In a case where the morphed face image 100 subjected to the morphing process to become closer to the face of the occupant has been obtained by the process in FIG. 7, the CPU 65 uses the morphed face image 100 as the face image of the occupant to be transmitted. In step ST16, the CPU 65 transmits the morphed face image 100 processed by the morphing process to the server apparatus 5, instead of the face image of the occupant of the automobile 2.

Note that the CPU 65 may transmit, to the server apparatus 5, an image in which the image region of the face of the occupant in the captured image by the in-vehicle camera 55 is substituted by the morphed face image 100 generated by the morphing process.

In step ST93, the CPU 65 acquires multiple sample face images to be used instead of the face of the occupant, as in step ST65.

In step ST94, the CPU 65 determines the degree of similarity between the face image of the occupant and the acquired multiple sample face images, as in step ST66.

In step ST95, the CPU 65 selects one sample face image to be used for processing, from the acquired multiple sample face images, as in step ST67.

In step ST96, the CPU 65 changes a patch, among multiple patches of the selected sample face image, corresponding to the patch with the peculiar luminance value identified regarding the face image of the occupant in step ST92, to the identified peculiar luminance value.

Thus, the CPU 65 may change, as a changing process, the luminance value of the patch region corresponding to the determination in the decision process, in the selected sample face image, to a peculiar luminance value indicating an injury to the occupant.

The CPU 65 may generate, as the selected sample face image, a face image including the patch with the peculiar luminance value similar to the face image of the occupant.

Thereafter, the CPU 65 causes the process to proceed to step ST68.

In the morphing process in step ST68, the CPU 65 executes morphing of making the point group information and the patch information regarding the sample face image after the changing process closer to the point group information and the patch information generated regarding the occupant. Thus, it is possible for the CPU 65 to generate a morphed face image including a peculiar luminance value similar to the face image of the occupant.

The CPU 65 ends the control, and causes the process to return to FIG. 7. In a case where the morphed face image subjected to the morphing process to become closer to the face of the occupant has been obtained by the process in FIG. 7, the CPU 65 uses the morphed face image as the face image of the occupant to be transmitted. In step ST16, the CPU 65 transmits the morphed face image generated by the morphing process to the server apparatus 5, instead of the face image of the occupant of the automobile 2.

Description is given next of the processed image generation control regarding the face image of the occupant of the automobile 2, with reference to a specific example.

FIG. 18 is an explanatory diagram of an example of the face image 71 as the captured region of the face of the driver in the present embodiment.

The face image 71 of the driver in FIG. 18 may be a face image segmented from the captured image 70 in FIG. 9 by the CPU 65, as with the face image 71 of the driver in FIG. 10.

The face image 71 of the driver in FIG. 18 includes an image component of a wound 104 on a right cheek of the driver, unlike the face image 71 of the driver in FIG. 10.

FIG. 19 is an explanatory diagram of an example of the point group information and the patch information to be generated regarding the face image 71 of the driver in FIG. 18.

The point group information and the patch information generated regarding the face image 71 of the driver in FIG. 19 are basically the same as the point group information and the patch information generated regarding the face image 71 of the driver in FIG. 12.

In step ST91, the CPU 65 generates respective luminance values of multiple patches generated regarding the face image 71 of the driver in FIG. 19. The luminance value of a patch 105 including the wound 104 on the right cheek, hatched in the drawing, is a luminance value different from the luminance values of surrounding patches, because of the luminance value of the wound 104. Moreover, the luminance value of the patch 105 including the wound 104 on the right cheek is a luminance value greatly different from the average luminance value of the entire face.

As a result, in step ST92, the CPU 65 determines that the patch 105 including the wound 104 on the right cheek of the face image 71 of the driver in FIG. 19 is a patch with a peculiar luminance value. In this case, the CPU 65 causes the process to proceed from step ST93 to step ST96.

FIG. 20 is an explanatory diagram of an example of the point group information and the patch information to be generated regarding the sample face image 91 selected from among multiple sample face images.

The point group information and the patch information generated regarding the sample face image 91 in FIG. 20 are basically the same as the point group information and the patch information generated regarding the sample face image 91 in FIG. 15.

In step ST96, the CPU 65 changes the luminance value of the patch, among multiple patches of the sample face image 91, corresponding to the patch determined as being peculiar in step ST92, to the peculiar luminance value used for the determination in step ST92.

Thus, the luminance value of a patch 106 hatched in the drawing is a luminance value different from those of surrounding patches, because of the luminance value of the wound 104 in the face image 71 of the driver.

FIG. 21 is an explanatory diagram of an example of the morphed face image 100 to be transmitted from the automobile 2 to the outside as the face image of the occupant.

After step ST96, in step ST68, the CPU 65 executes the morphing process on the sample face image 91 in FIG. 20.

Thus, the CPU 65 generates the morphed face image 100 in FIG. 21.

The morphed face image 100 in FIG. 21 includes, on the right cheek of the face, a portion 107 having a different luminance value from its surroundings.

Such an image is outputted and displayed on the server display device 13, which allows the operator to easily notice that the face of the driver has, for example, a wound on the right cheek.

As described, in the present embodiment, the CPU 65 of the automobile 2 may determine whether or not the patch region defined by the patch information generated in the patch generation process includes a luminance value indicating an injury to the occupant. By the changing process, the CPU 65 of the automobile 2 changes, in the selected sample face image 91, the luminance value of the patch corresponding to the determined patch region, to the peculiar luminance value that is able to indicate the injury to the occupant. Thereafter, in the morphing process, the CPU 65 of the automobile 2 executes morphing of making the point group information and the patch information regarding the sample face image 91 after the changing process closer to the point group information and the patch information generated regarding the occupant.

As a result, the morphed face image 100 outputted from the server apparatus 5 includes a luminance portion corresponding to the injury to the occupant. It is possible for the operator to accurately grasp the state of the occupant, e.g., presence or absence of an injury to the occupant, based on the "face image of the occupant" outputted.

In particular, in the present embodiment, the face image of the other person is selected with use of the luminance value of the face image 71 of the driver as a reference.

As a result, the luminance portion corresponding to the injury to the occupant tends to appear clearly as in the face image 71 of the driver, also in the face image of the other person.

The embodiments described above are preferred examples of embodiments of the invention. However, the invention is not limited to those, and various modifications and alternations may be made without departing from the scope of the gist of the invention.

In the above-described embodiment, the CPU 65 segments a portion of the captured image by the wide-angle in-vehicle camera 55, as the face image 71 including the face of the occupant, and executes subsequent processes on the segmented image.

In another example, the CPU 65 may use the captured image by the wide-angle in-vehicle camera 55 as it is as the face image of the occupant, and use the captured image for subsequent processes. In this case, for example, as illustrated in FIG. 9, the face image 71 includes another person different from the occupant regarding which the morphing process is to be carried out. The CPU 65 may perform the morphing process also for this other person. In another example, for the other person, the CPU 65 may abstract the image, simply substitute the image by another image, or mask the image.

The invention claimed is:

1. A vehicle service providing system comprising a vehicle and a server apparatus, the vehicle transmitting information to the server apparatus, the server apparatus providing a service based on the information received,
the vehicle including an in-vehicle camera and a vehicle controller, the in-vehicle camera being configured to capture an image of an occupant of the vehicle,
the server apparatus including an output unit and a server controller, the output unit outputting an image, wherein
the vehicle controller is configured to execute
an occupant image acquisition process of acquiring a captured image including a face of the occupant, from the in-vehicle camera,
a luminance value generation process of generating a luminance value of the face of the occupant in the acquired captured image,
a sample image acquisition process of acquiring sample face images regarding other persons different from the occupant to be segmented from the captured image,
a determination process of determining a degree of similarity between luminance values of the acquired sample face images and the luminance value of the face of the occupant generated by the luminance value generation process,
a selection process of selecting a sample face image whose degree of similarity in the luminance value is highest in the determination process, and
a morphing process of carrying out morphing of making the selected sample face image closer to the face of the occupant in the acquired captured image, to generate a morphed face image, and
transmit the morphed face image generated by the processes to the server apparatus, instead of the captured image including the face of the occupant, and
the server controller is configured to execute, with use of information received from the vehicle controller of the vehicle, a process not executed by the vehicle controller, among the luminance value generation process, the sample image acquisition process, the determination process, the selection process, and the morphing process, and cause the output unit to output the morphed face image generated by the morphing process, instead of an image of the face of the occupant of the vehicle.

2. The vehicle service providing system according to claim 1, wherein the vehicle controller executes, together with the occupant image acquisition process, the luminance value generation process, the sample image acquisition process, the determination process, the selection process, and the morphing process, and transmits the morphed face image generated by the morphing process to the server apparatus, instead of the image of the face of the occupant of the vehicle.

3. The vehicle service providing system according to claim 2, wherein, in the sample image acquisition process, the vehicle controller acquires the sample face images having different luminance values from each other, from a memory of the vehicle or from the server apparatus.

4. The vehicle service providing system according to claim 1, wherein the vehicle controller further executes
a segmentation process of segmenting a captured region of the face of the occupant from the captured image acquired from the in-vehicle camera,
a point group generation process of generating point group information regarding the face, the point group information indicating an outline of the face and positions of elements of the face, in the segmented captured region of the face of the occupant, and
a patch generation process of generating patch information with use of the generated point group information as a reference for image separation, the patch information separating the segmented captured region of the face of the occupant, and
carries out, in the morphing process, morphing of making point group information and patch information regarding the sample face image selected by the selection process closer to the point group information and the patch information generated regarding the occupant, to generate the morphed face image.

5. The vehicle service providing system according to claim 2, wherein the vehicle controller further executes
a segmentation process of segmenting a captured region of the face of the occupant from the captured image acquired from the in-vehicle camera,
a point group generation process of generating point group information regarding the face, the point group information indicating an outline of the face and positions of elements of the face, in the segmented captured region of the face of the occupant, and
a patch generation process of generating patch information with use of the generated point group information as a reference for image separation, the patch information separating the segmented captured region of the face of the occupant, and
carries out, in the morphing process, morphing of making point group information and patch information regarding the sample face image selected by the selection process closer to the point group information and the patch information generated regarding the occupant, to generate the morphed face image.

6. The vehicle service providing system according to claim 3, wherein the vehicle controller further executes
a segmentation process of segmenting a captured region of the face of the occupant from the captured image acquired from the in-vehicle camera,
a point group generation process of generating point group information regarding the face, the point group information indicating an outline of the face and positions of elements of the face, in the segmented captured region of the face of the occupant, and
a patch generation process of generating patch information with use of the generated point group information as a reference for image separation, the patch information separating the segmented captured region of the face of the occupant, and
carries out, in the morphing process, morphing of making point group information and patch information regarding the sample face image selected by the selection process closer to the point group information and the patch information generated regarding the occupant, to generate the morphed face image.

7. The vehicle service providing system according to claim 4, wherein the vehicle controller further executes
a decision process of determining that a patch region defined by the patch information generated in the patch generation process includes a peculiar luminance value indicating an injury to the occupant, and
a changing process of changing, in the selected sample face image, a luminance value of a patch region corresponding to the determination in the decision process, to the peculiar luminance value indicating the injury to the occupant, and
carries out, in the morphing process, morphing of making point group information and patch information regarding the sample face image subjected to the changing process closer to the point group information and the patch information generated regarding the occupant, to generate the morphed face image.

8. The vehicle service providing system according to claim 5, wherein the vehicle controller further executes
a decision process of determining that a patch region defined by the patch information generated in the patch generation process includes a peculiar luminance value indicating an injury to the occupant, and
a changing process of changing, in the selected sample face image, a luminance value of a patch region corresponding to the determination in the decision process, to the peculiar luminance value indicating the injury to the occupant, and
carries out, in the morphing process, morphing of making point group information and patch information regarding the sample face image subjected to the changing process closer to the point group information and the patch information generated regarding the occupant, to generate the morphed face image.

9. The vehicle service providing system according to claim 6, wherein the vehicle controller further executes
a decision process of determining that a patch region defined by the patch information generated in the patch generation process includes a peculiar luminance value indicating an injury to the occupant, and
a changing process of changing, in the selected sample face image, a luminance value of a patch region corresponding to the determination in the decision process, to the peculiar luminance value indicating the injury to the occupant, and
carries out, in the morphing process, morphing of making point group information and patch information regarding the sample face image subjected to the changing process closer to the point group information and the patch information generated regarding the occupant, to generate the morphed face image.

\* \* \* \* \*